(12) United States Patent
Ko et al.

(10) Patent No.: US 11,577,650 B2
(45) Date of Patent: Feb. 14, 2023

(54) APPARATUS AND METHOD FOR CONTROLLING SIDE MIRROR SYSTEM FOR VEHICLE

(71) Applicant: Samsung Electronics Co., Ltd., Suwon-si (KR)

(72) Inventors: Sung Chan Ko, Suwon-si (KR); Sung Kwon Kim, Suwon-si (KR); Seung Bin Im, Suwon-si (KR); Jae Mo Choi, Suwon-si (KR); Deok Yeol Lee, Suwon-si (KR); Chang Youl Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 16/198,523

(22) Filed: Nov. 21, 2018

(65) Prior Publication Data

US 2019/0161014 A1    May 30, 2019

(30) Foreign Application Priority Data

Nov. 24, 2017   (KR) .................. 10-2017-0158748

(51) Int. Cl.
*B60R 1/074*    (2006.01)
*B60R 1/00*     (2022.01)
(Continued)

(52) U.S. Cl.
CPC ............... *B60R 1/074* (2013.01); *B60R 1/00* (2013.01); *B60R 1/062* (2013.01); *B60R 1/12* (2013.01);
(Continued)

(58) Field of Classification Search
CPC ........... B60R 1/074; B60R 1/00; B60R 1/062; B60R 1/12; B60R 11/04; B60R 2300/105; B60R 2300/40; B60R 2300/70; B60S 1/02
See application file for complete search history.

(56) References Cited

U.S. PATENT DOCUMENTS

| 5,969,890 A | 10/1999 | Whitehead |
| 6,139,159 A | 10/2000 | Whitehead |

(Continued)

FOREIGN PATENT DOCUMENTS

| DE | 10 2014 213 279 A1 | 1/2016 |
| JP | 2010-116125 A | 5/2010 |

(Continued)

OTHER PUBLICATIONS

English Machine Translation of JP2010116125A (Year: 2010).*

(Continued)

*Primary Examiner* — Faris S Almatrahi
*Assistant Examiner* — Andrew J Cromer
(74) *Attorney, Agent, or Firm* — Jefferson IP Law, LLP

(57) ABSTRACT

A side mirror system for a vehicle is provided. The side mirror system includes a camera disposed outside a vehicle and capturing a peripheral area of the vehicle, an electronic side mirror including a mirror panel and a display panel, a moving device moving the electronic side mirror to an inside or an outside of the vehicle, and at least one control circuit electrically connected to the camera, the electronic side mirror, and the moving device, wherein the at least one control circuit controls the electronic side mirror such that the electronic side mirror outputs an image obtained by the camera through the display panel or the peripheral area of the vehicle is reflected by the mirror panel and controls the moving device such that the electronic side mirror moves (Continued)

from the outside of the vehicle to the inside of the vehicle, when a specified condition is satisfied.

15 Claims, 25 Drawing Sheets

(51) Int. Cl.
*B60R 1/12* (2006.01)
*B60R 1/062* (2006.01)
*B60S 1/02* (2006.01)
*G02B 27/00* (2006.01)

(52) U.S. Cl.
CPC ............ *B60S 1/02* (2013.01); *G02B 27/0006* (2013.01); *B60R 2001/1223* (2013.01); *B60R 2001/1253* (2013.01); *B60R 2300/8026* (2013.01)

(56) References Cited

U.S. PATENT DOCUMENTS

| | | | |
|---|---|---|---|
| 9,317,245 B2 | 4/2016 | Oh et al. | |
| 9,834,146 B2 | 12/2017 | Vanderploeg et al. | |
| 2004/0200948 A1* | 10/2004 | Bos | B60S 1/0822 250/208.1 |
| 2005/0146607 A1 | 7/2005 | Linn et al. | |
| 2011/0149077 A1* | 6/2011 | Robert | B60R 1/12 348/148 |
| 2011/0228192 A1* | 9/2011 | Hollaway | G02F 1/13338 445/24 |
| 2014/0285666 A1 | 9/2014 | O'Connell et al. | |
| 2014/0306967 A1 | 10/2014 | Oh et al. | |
| 2015/0277203 A1 | 10/2015 | Vanderploeg et al. | |
| 2017/0060234 A1 | 3/2017 | Sung | |
| 2017/0113615 A1 | 4/2017 | Fendt | |
| 2018/0201190 A1 | 7/2018 | O'Connell et al. | |

FOREIGN PATENT DOCUMENTS

| | | | | |
|---|---|---|---|---|
| JP | 2010116125 A | * | 5/2010 | |
| JP | 2016-037110 A | | 3/2016 | |
| JP | 2017-171137 A | | 9/2017 | |
| KR | 20130128793 A | * | 11/2013 | ............ B60R 1/074 |
| KR | 10-2014-0122967 A | | 10/2014 | |
| KR | 10-2017-0024904 A | | 3/2017 | |

OTHER PUBLICATIONS

English Machine Translation of KR20130128793A (Year: 2013).*
Extended European Search Report dated Jan. 7, 2019, issued in the European patent application No. 18207768.5.

* cited by examiner

APPARATUS AND METHOD FOR CONTROLLING SIDE MIRROR SYSTEM FOR VEHICLE

CROSS-REFERENCE TO RELATED APPLICATION(S)

This application is based on and claims priority under 35 U.S.C. § 119(a) of a Korean patent application number 10-2017-0158748, filed on Nov. 24, 2017, in the Korean Intellectual Property Office, the disclosure of which is incorporated by reference herein in its entirety.

BACKGROUND

1. Field

The disclosure relates to an apparatus and a method for controlling a side mirror system for a vehicle. More particularly, the disclosure relates to a method of moving an electronic side mirror to the inside of the vehicle under a specified condition, while an electronic side mirror is disposed outside a vehicle.

2. Description of Related Art

For the purpose of verifying the peripheral area of a vehicle, the vehicle may include side mirrors in the right side and the left side of the vehicle. A driver may verify the peripheral area of the vehicle by using light reflected from optical mirrors of the side mirrors. For the purpose of addressing the inconvenience that the driver can not verify blind spots of the side mirrors, the vehicle may include an electronic side mirror (E side mirror) instead of a side mirror including an optical mirror. The electronic side mirror may include a display. The display may output an image, which is obtained by a camera module mounted in the vehicle and which is associated with the peripheral area of the vehicle. The camera module may obtain the image of a range wider than the optical mirror.

The above information is presented as background information only to assist with an understanding of the disclosure. No determination has been made, and no assertion is made, as to whether any of the above might be applicable as prior art with regard to the disclosure.

SUMMARY

With the development of an electronic side mirror, a location where an electronic side mirror is disposed may be discussed. When the electronic side mirror is interposed between a driver's seat and a passenger's seat as a center information display (CID) or is disposed on a dashboard or in a rear-view mirror, the electronic side mirror may violate regulations of European Union (EU) and the driver of the vehicle may feel inconvenience because the driver needs to verify a peripheral area of the vehicle in a direction different from the existing direction. When the electronic side mirror is disposed inside an A-pillar, the driver's view may not be secured. When the electronic side mirror is disposed on a cluster, the driver's eyes may be fatigued due to an image always output by a display. When the electronic side mirror is disposed at a location the same as the side mirror of the related art, the driver may feel inconvenience to verify the peripheral area of the vehicle in a weather state of poor visibility.

Furthermore, in the case where the display of the electronic side mirror does not operate normally, the vehicle may not output the image obtained through a camera module, to the driver of the vehicle.

Aspects of the disclosure are to address at least the above-mentioned problems and/or disadvantages and to provide at least the advantages described below. Accordingly, an aspect of the disclosure is to provide a method of moving an electronic side mirror to the inside of the vehicle under a specified condition, while an electronic side mirror is disposed outside a vehicle.

Another aspect of the disclosure is to provide a method in which an electronic side mirror operates in a mirror mode when a display of the electronic side mirror does not operate normally.

Additional aspects will be set forth in part in the description which follows and, in part, will be apparent from the description, or may be learned by practice of the presented embodiments.

In accordance with an aspect of the disclosure, a side mirror system for a vehicle is provided. The side mirror system includes a camera disposed outside the vehicle and capturing a peripheral area of the vehicle, an electronic side mirror including a mirror panel and a display panel, a moving device moving the electronic side mirror to an inside or an outside of the vehicle, and at least one control circuit electrically connected to the camera, the electronic side mirror, and the moving device. The at least one control circuit may be configured to control the electronic side mirror such that the electronic side mirror outputs an image obtained by the camera through the display panel or the peripheral area of the vehicle is reflected by the mirror panel and to control the moving device such that the electronic side mirror moves from the outside of the vehicle to the inside of the vehicle, when a specified condition is satisfied.

In accordance with another aspect of the disclosure, a side mirror system for a vehicle is provided. The side mirror system includes a sensor (or, a sensor), a camera (or, a camera) disposed outside the vehicle and capturing a peripheral area of the vehicle, an electronic side mirror including a mirror panel and a display panel, a moving device moving the electronic side mirror to an inside or an outside of the vehicle, and at least one control circuit electrically connected to the camera, the electronic side mirror, and the moving device. The at least one control circuit may be configured to control the electronic side mirror such that the electronic side mirror outputs an image obtained by the camera through the display panel or the peripheral area of the vehicle is reflected by the mirror panel, to detect an outside weather state of the vehicle through the sensor, and to control the moving device such that the electronic side mirror moves from the outside of the vehicle to the inside of the vehicle based on the detected weather state.

In accordance with another aspect of the disclosure, a method of a side mirror system for a vehicle is provided. The side mirror system includes detecting a specified condition and controlling a moving device such that an electronic side mirror including a mirror panel and a display panel moves from an outside of the vehicle to an inside of the vehicle. The electronic side mirror may be configured to output an image obtained by a camera through the display panel or is configured such that a peripheral area of the vehicle is reflected by the mirror panel.

According to various embodiments of the disclosure, a side mirror system for a vehicle may include an electronic side mirror disposed outside the vehicle, thereby preventing a driver from feeling inconvenience or fatigue without violating regulations of EU.

According to various embodiments of the disclosure, a side mirror system for a vehicle may control a moving device such that an electronic side mirror moves to the inside or the outside of the vehicle, and thus may provide an environment in which a driver is capable of verifying the peripheral area of the vehicle even in bad weather.

According to various embodiments of the disclosure, a side mirror system for a vehicle may control an electronic side mirror so as to perform the function of an optical mirror, and thus may provide a driver with a backup environment when a display does not operate normally.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
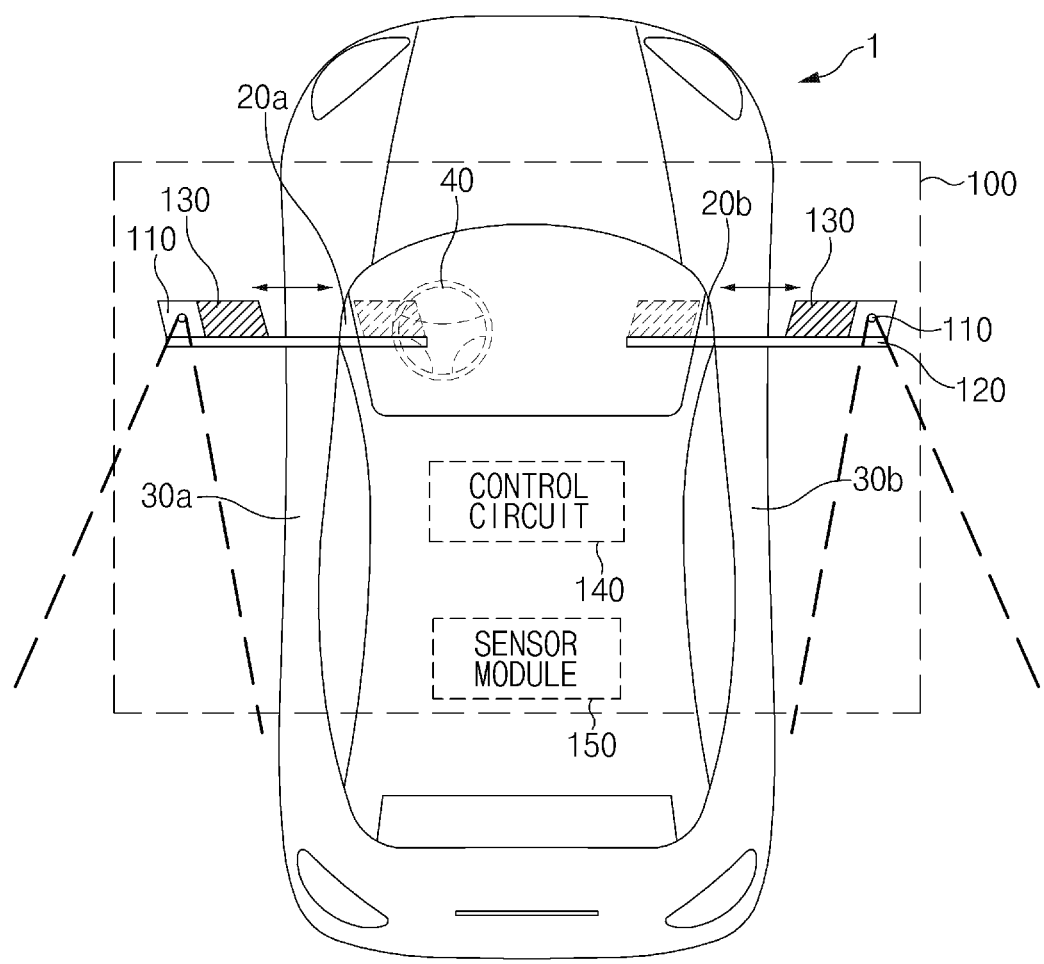
FIG. 1 illustrates a vehicle including a side mirror system for a vehicle according to various embodiments of the disclosure.

FIG. 1 illustrates a vehicle including a side mirror system for a vehicle according to various embodiments of the disclosure.

Referring to FIG. 1, a vehicle 1 may include a side mirror system 100 for a vehicle used to verify the peripheral area of the vehicle 1. The side mirror system 100 for a vehicle may include a camera module 110 (or, a camera 110), a moving unit 120, an electronic side mirror 130, at least one control circuit 140, and a sensor module 150. According to an embodiment of the disclosure, the vehicle 1 may not include a part of components illustrated in FIG. 1 or may further include a new component. For example, the vehicle 1 may not include the sensor module 150 and may include an input device that receives a user input. For another example, the vehicle 1 may further include a removing unit that removes rainwater or a foreign object from the front surface of the electronic side mirror 130.

According to an embodiment of the disclosure, the camera module 110 may obtain an image associated with the peripheral area of the vehicle 1. The camera module 110 may be disposed outside the vehicle 1. For example, the left camera module may be disposed on the left side of an A-pillar 20a, and the right camera module may be disposed on the right side of an A-pillar 20b. For another example, each of the left camera module and the right camera module may be disposed in the body (e.g., doors 30a and 30b) of the vehicle 1.

According to an embodiment of the disclosure, the camera module 110 may include at least one lens assembly capable of collecting light emitted from a subject, a flash capable of emitting a light source used to strengthen light emitted from the subject, an image sensor capable of converting light transmitted from the subject through the lens assembly into an electrical signal, an image stabilizer capable of at least partly compensating (e.g., adjust read-out timing) for negative effects (e.g., image blurring) caused by the movement of the camera module 110 or the vehicle 1, a memory capable of temporarily storing at least part of the image obtained through the image sensor, or an image signal processor capable of performing processing (e.g., noise reduction, resolution adjustment, brightness adjustment, blurring, sharpening, or softening) on an image obtained through the image sensor or an image stored in the memory.

According to an embodiment of the disclosure, the image signal processor may not be included in the camera module 110, and may be included in the at least one control circuit 140.

According to an embodiment of the disclosure, the electronic side mirror 130 may be used such that the driver of the vehicle 1 verifies the peripheral area of the vehicle 1. The electronic side mirror 130 may be disposed outside the vehicle 1. According to an embodiment of the disclosure, the electronic side mirror 130 may be moved from the outside of the vehicle 1 to the inside of the vehicle 1 by the moving unit 120, or vice versa.

According to an embodiment of the disclosure, the electronic side mirror 130 may include a display panel that outputs an image obtained from the camera module 110. For example, the display panel may include at least one of a liquid crystal display (LCD), a thin film transistor-liquid crystal display (TFT LCD), an organic light-emitting diode (OLED), and a plasma display panel (PDP).

According to an embodiment of the disclosure, the electronic side mirror 130 may include a mirror panel to perform the function of an optical mirror that reflects the peripheral area of the vehicle through the reflection of light. For example, the mirror panel may include a mirror film that reflects all of the light or may include a half mirror film, which reflects a part of light and through which the remaining parts of light pass. The electronic side mirror 130 may perform the function of an optical mirror through a mirror panel or may perform the function of an electronic display through a display panel. In the disclosure, a state where the electronic side mirror 130 performs the function of the optical mirror may be referred to as a "mirror mode"; a state where the electronic side mirror 130 performs the function of the electronic display may be referred to as a "display mode". An example in which the electronic side mirror 130 operates in the mirror mode or the display mode will be described with reference to FIG. 9.

According to an embodiment of the disclosure, the moving unit 120 may move the electronic side mirror 130 to the outside or the inside of the vehicle 1. According to an embodiment of the disclosure, the moving unit 120 may be disposed over the inside and the outside of the vehicle 1 through a hole disposed on the side surface (e.g., the A-pillar 20a or 20b) of the vehicle 1. According to an embodiment of the disclosure, the moving unit 120 may include a rail, linear gear, or hinge structure to move the electronic side mirror 130.

According to an embodiment of the disclosure, the at least one control circuit 140 may include a software or hardware module. For example, the at least one control circuit 140 may include at least one of application specific integrated circuits (ASICs), digital signal processors (DSPs), digital signal processing devices (DSPDs), programmable logic devices (PLDs), field programmable gate arrays (FPGAs), processors, controllers, micro-controllers, and microprocessors. According to an embodiment of the disclosure, the at least one control circuit 140 may be referred to as an "electronic control unit (ECU)".

According to an embodiment of the disclosure, the at least one control circuit 140 may be electrically connected to the camera module 110, the moving unit 120, and the electronic side mirror 130. For example, the at least one control circuit 140 may communicate with other components through a controller area network (CAN) communication protocol of the vehicle 1.

According to an embodiment of the disclosure, the at least one control circuit 140 may perform the overall function of the side mirror system 100 for a vehicle. For example, the at least one control circuit 140 may process the image obtained by the camera module 110 and may output the processed image through the electronic side mirror 130. For another example, the at least one control circuit 140 may control the moving unit 120 such that the electronic side mirror 130 moves to the inside or outside of the vehicle 1 based on a specified condition. For example, the specified condition may include a user input, an outside weather condition of the vehicle 1 detected by the sensor module 150, whether the camera module 110 fails, or whether a display panel included in the electronic side mirror 130 fails.

According to an embodiment of the disclosure, the sensor module 150 may detect the outside weather condition of the vehicle 1 by measuring the temperature, humidity, brightness, wind speed, or barometric pressure of the outside of the vehicle 1. There are one or more sensor modules 150. The sensor module 150 may transmit information about the outside weather condition to the at least one control circuit 140.

Figure 2A:
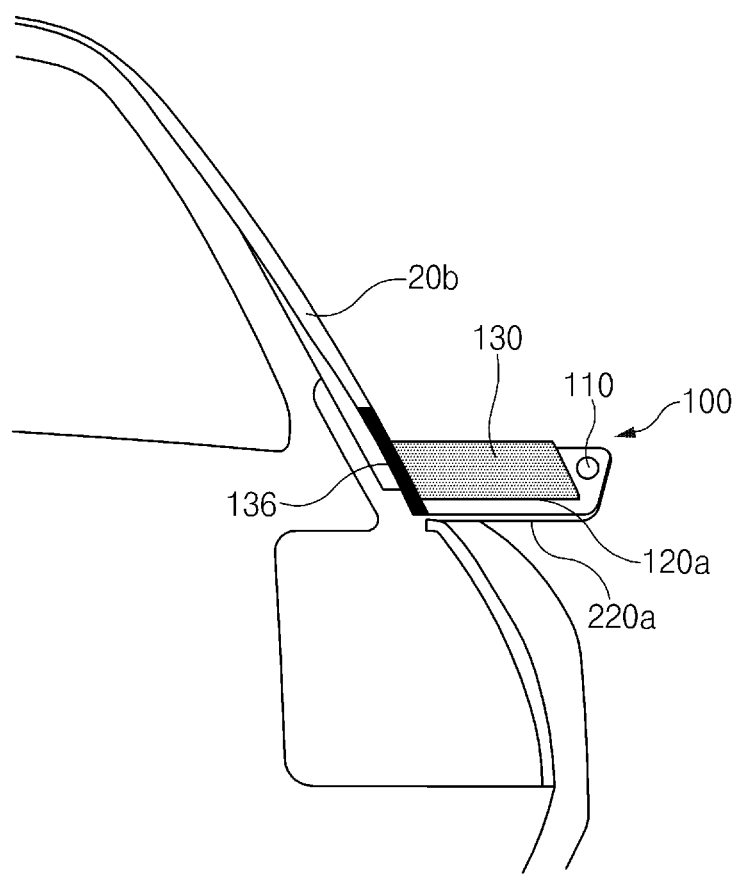
FIG. 2A illustrates a structure in which an electronic side mirror is attached to a lower-end mounting unit and is disposed outside the vehicle according to various embodiments of the disclosure.

FIG. 2A illustrates a structure in which an electronic side mirror is attached to a lower-end mounting unit and is disposed outside the vehicle according to various embodiments of the disclosure. FIG. 2A illustrates a view of the vehicle 1 viewed from the right rear of the vehicle 1. FIG. 2A illustrates the electronic side mirror 130 disposed on the right side of the vehicle 1. However, a similar principle may be applied to the electronic side mirror 130 disposed on the left side of the vehicle 1.

Referring to FIG. 2A, the side mirror system 100 for a vehicle may include a lower-end mounting unit 220a to support the camera module 110, the moving unit 120, and the electronic side mirror 130 outside the vehicle 1. According to an embodiment of the disclosure, the lower-end mounting unit 220a may be disposed on the right side of the A-pillar 20b.

According to an embodiment of the disclosure, the camera module 110 may be mounted on the one side of the lower-end mounting unit 220a so as to obtain an image associated with the right rear of the vehicle 1. FIG. 2A illustrates an example in which the camera module 110 is disposed on the rear surface of the lower-end mounting unit 220a. However, the location of the camera module 110 may not be limited to the example illustrated in FIG. 2A.

According to an embodiment of the disclosure, the moving unit 120 and the electronic side mirror 130 may be disposed on the top surface of the lower-end mounting unit 220a. For example, the moving unit 120 may be disposed at a first location 120a indicating the top surface of the lower-end mounting unit 220a, and the top surface of the moving unit 120 disposed at the first location 120a may be coupled to the bottom surface of the electronic side mirror 130. When the moving unit 120 moves to the inside of the vehicle 1 under control of the at least one control circuit 140, the electronic side mirror 130 coupled to the moving unit 120 may also move to the inside of the vehicle 1.

According to an embodiment of the disclosure, the side mirror system 100 for a vehicle may further include a removing unit 136 for removing rainwater or a foreign object from the electronic side mirror 130. According to an embodiment of the disclosure, the removing unit 136 may be located in the middle of the path of the electronic side mirror 130 moving to the inside or the outside of the vehicle 1. The removing unit 136 may operate under control of the at least one control circuit 140 or may remove rainwater or a foreign object from the electronic side mirror 130 without a separate control.

According to an embodiment of the disclosure, the side mirror system 100 for a vehicle may further include a housing for protecting the electronic side mirror 130. In the case where the side mirror system 100 for a vehicle further includes the housing, the bottom surface of the housing may be coupled to the top surface of the moving unit 120.

Figure 2B:
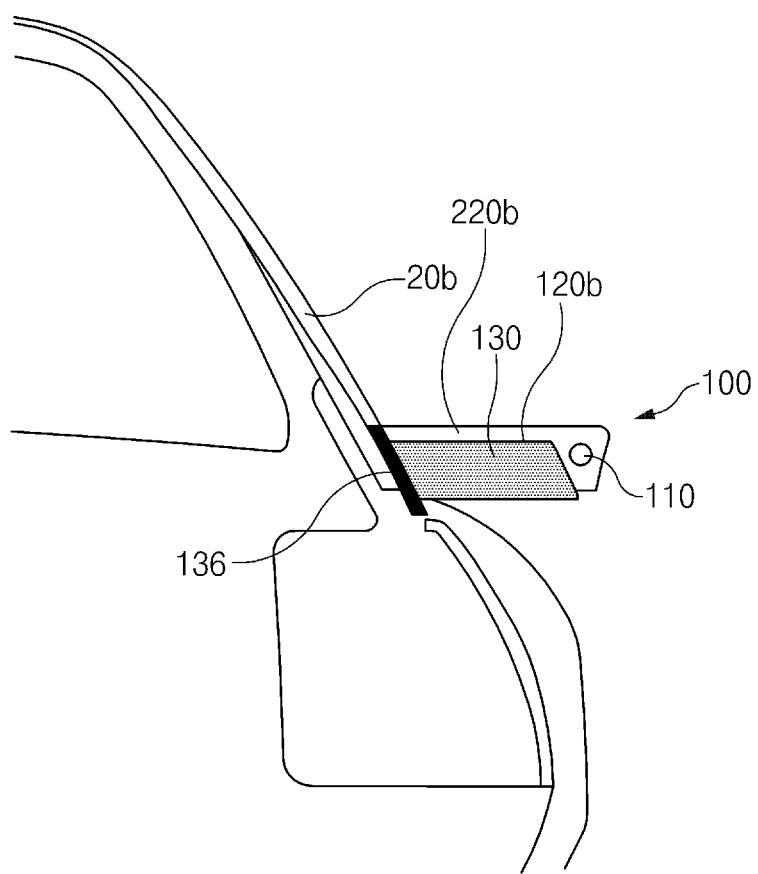
FIG. 2B illustrates a structure in which an electronic side mirror is attached to an upper-end mounting unit and is disposed outside the vehicle according to various embodiments of the disclosure.

FIG. 2B illustrates a structure in which an electronic side mirror is attached to an upper-end mounting unit and is disposed outside the vehicle according to various embodiments of the disclosure.

Referring to FIG. 2B, the side mirror system 100 for a vehicle may include an upper-end mounting unit 220b to support the camera module 110, the moving unit 120, and the electronic side mirror 130 outside the vehicle 1. According to an embodiment of the disclosure, the upper-end mounting unit 220b may be disposed on the right side of the A-pillar 20b.

According to an embodiment of the disclosure, the moving unit 120 and the electronic side mirror 130 may be disposed on the bottom surface of the upper-end mounting unit 220b. For example, the moving unit 120 may be disposed at a second location 120b indicating the bottom surface of the upper-end mounting unit 220b, and the bottom surface of the moving unit 120 disposed at the second location 120b may be coupled to the top surface of the electronic side mirror 130.

According to an embodiment of the disclosure, the side mirror system 100 for a vehicle may further include the removing unit 136 for removing rainwater or a foreign object from the electronic side mirror 130 or a housing for protecting the electronic side mirror 130.

Figure 2C:
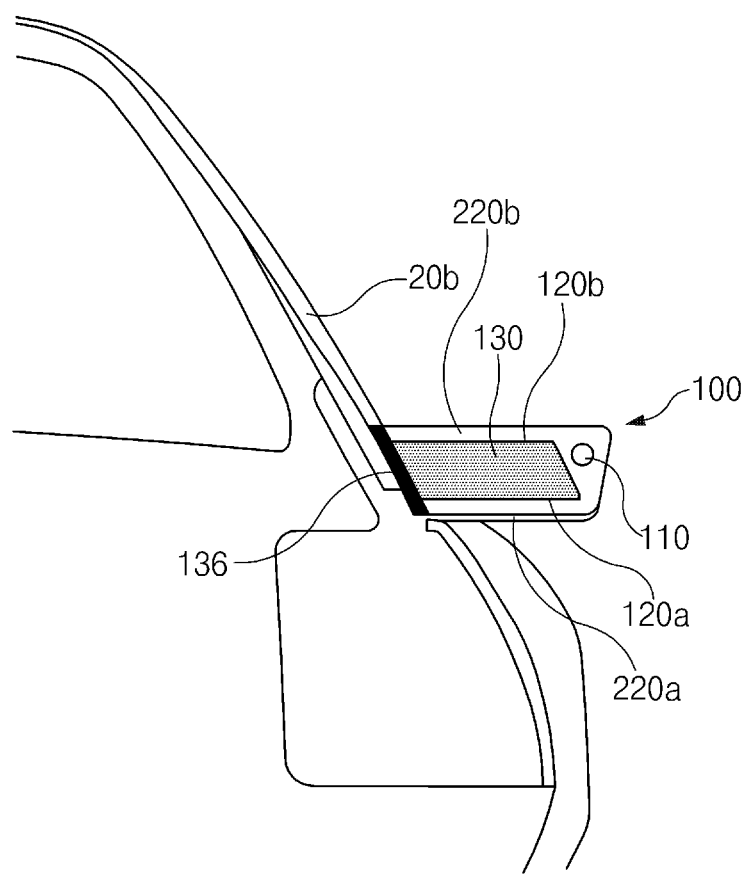
FIG. 2C illustrates a structure in which an electronic side mirror is attached to a plurality of mounting units and is disposed outside the vehicle according to various embodiments of the disclosure.

FIG. 2C illustrates a structure in which an electronic side mirror is attached to a plurality of mounting units and is disposed outside the vehicle according to various embodiments of the disclosure.

Referring to FIG. 2C, the side mirror system 100 for a vehicle may include the lower-end mounting unit 220a and the upper-end mounting unit 220b. The moving unit 120 and the electronic side mirror 130 may be interposed between the bottom surface of the upper-end mounting unit 220b and the top surface of the lower-end mounting unit 220a. According to an embodiment of the disclosure, the moving unit 120 may be at least one. The at least one moving unit 120 may be disposed at the first location 120a or the second location 120b.

Figure 3:
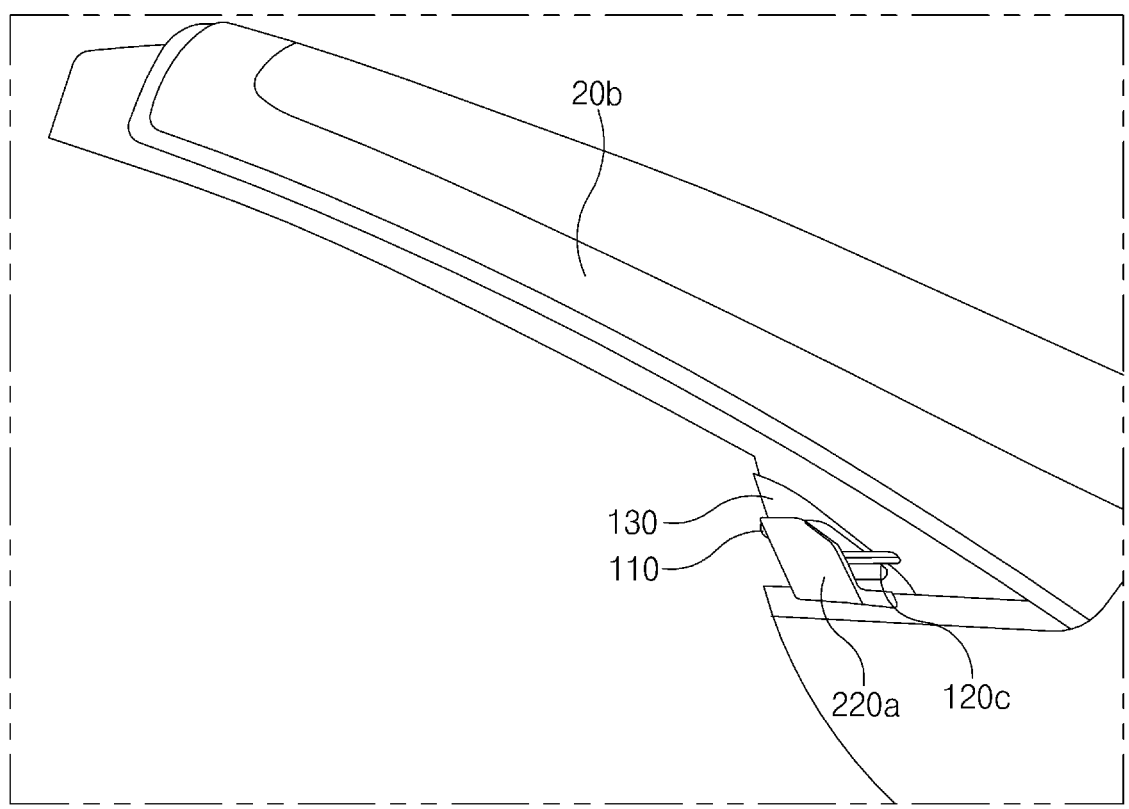
FIG. 3 illustrates a side view illustrating a moving unit being coupled to a side surface of an electronic side mirror according to various embodiments of the disclosure.

FIG. 3 illustrates a side view illustrating a moving unit being coupled to a side surface of an electronic side mirror according to various embodiments of the disclosure. FIG. 3 illustrates a view of the vehicle 1 viewed from the right side of the vehicle 1. FIG. 3 illustrates an example in which the side mirror system 100 for a vehicle includes the lower-end mounting unit 220a. However, the same principle may be applied to an example including the upper-end mounting unit 220b or a plurality of mounting units.

Referring to FIG. 3, the electronic side mirror 130 may be disposed on the top surface of the lower-end mounting unit 220a, and the moving unit 120 may be disposed at a third location 120c indicating the rear surface (a surface on which a screen is not displayed) of the electronic side mirror 130. The electronic side mirror 130 may be moved by the moving unit 120 disposed at the third location 120c.

According to an embodiment of the disclosure, the location of the moving unit 120 may be at least one of the first location 120a, the second location 120b, and the third location 120c. In embodiments described below, the location of the moving unit 120 or the number of moving units 120 is not limited to the specific location or the specific number.

Figure 4A:
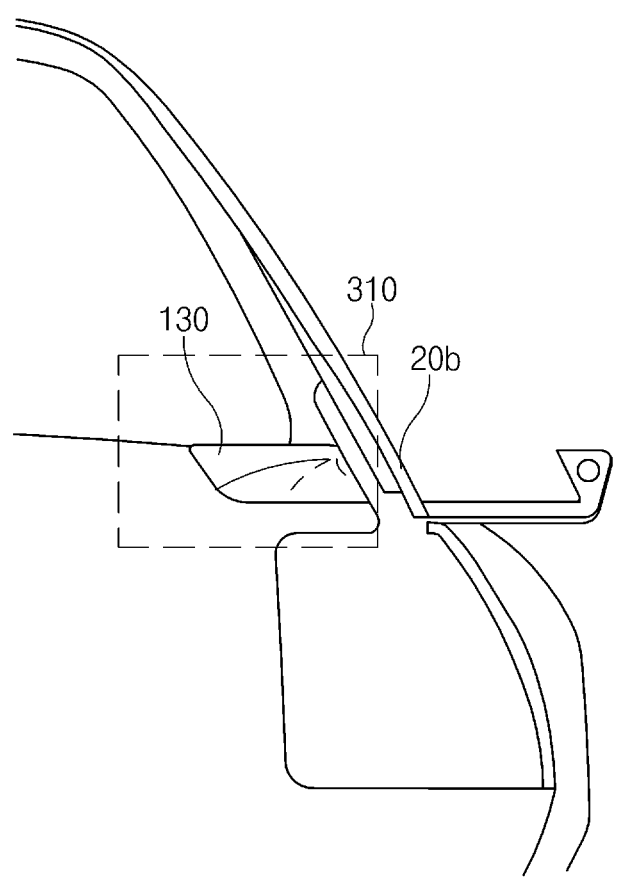
FIG. 4A illustrates a structure in which a right electronic side mirror is disposed inside a vehicle according to various embodiments of the disclosure.

FIG. 4A illustrates a structure in which a right electronic side mirror is disposed inside a vehicle according to various embodiments of the disclosure.

Referring to FIG. 4A, when a specified condition is satisfied, the at least one control circuit 140 may control the moving unit 120 such that the electronic side mirror 130 moves from the outside of the vehicle 1 to the inside of the vehicle 1. In other words, the electronic side mirror 130 may move from the right side of the A-pillar 20b to the left side of the A-pillar 20b through the moving unit 120. For example, when the moving unit 120 includes a rail structure or a linear gear structure, the at least one control circuit 140 may control the moving unit 120 such that the electronic side mirror 130 moves to the left. For another example, when the moving unit 120 includes a hinge structure, the at least one control circuit 140 may fold the moving unit 120 such that the electronic side mirror 130 moves to the inside of the vehicle 1.

According to an embodiment of the disclosure, the at least one control circuit 140 may control the moving unit 120 such that the electronic side mirror 130 is disposed at a specified location. For example, the specified location may be an area (e.g., the front surface of the air conditioner of a passenger's seat) indicated by a reference numeral 310. According to an embodiment of the disclosure, the specified location may be changed by a user input.

According to an embodiment of the disclosure, while the electronic side mirror 130 moves to the inside of the vehicle 1, or after the electronic side mirror 130 moves to the inside of the vehicle 1, the at least one control circuit 140 may allow the electronic side mirror 130 to change the tilt of the electronic side mirror 130. According to an embodiment of the disclosure, the tilt of the electronic side mirror 130 may be changed by a user input.

Figure 4B:
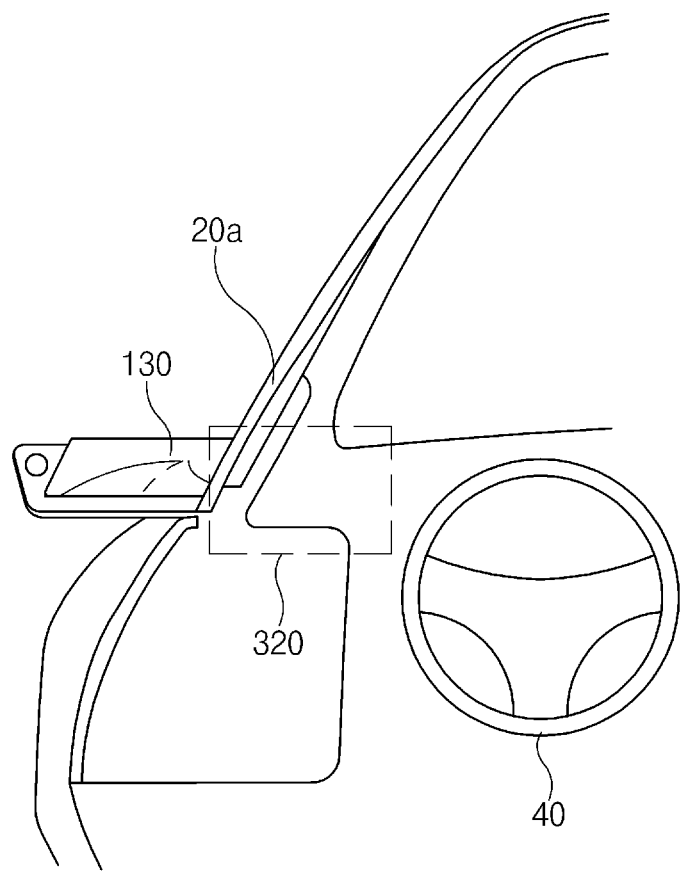
FIG. 4B illustrates a structure in which a left electronic side mirror is disposed inside a vehicle according to various embodiments of the disclosure.

FIG. 4B illustrates a structure in which a left electronic side mirror is disposed inside a vehicle according to various embodiments of the disclosure.

Referring to FIG. 4B, the at least one control circuit 140 may control the moving unit 120 such that the electronic side mirror 130 moves from the outside of the vehicle 1 to the inside of the vehicle 1. In other words, the electronic side mirror 130 may move from the left side of the A-pillar 20a to the right side of the A-pillar 20a through the moving unit 120. According to an embodiment of the disclosure, the at least one control circuit 140 may control the moving unit 120 such that the electronic side mirror 130 is disposed at a specified location. For example, the specified location may be an area (e.g., the front surface of the air conditioner of a driver's seat or a space between the A-pillar 20a and a steering wheel 40) indicated by a reference numeral 320. According to an embodiment of the disclosure, the specified location may be changed by a user input. According to an embodiment of the disclosure, while the electronic side mirror 130 moves to the inside of the vehicle 1 or after the electronic side mirror 130 moves to the inside of the vehicle 1, the tilt of the electronic side mirror 130 may be changed by the at least one control circuit 140.

Figure 5:
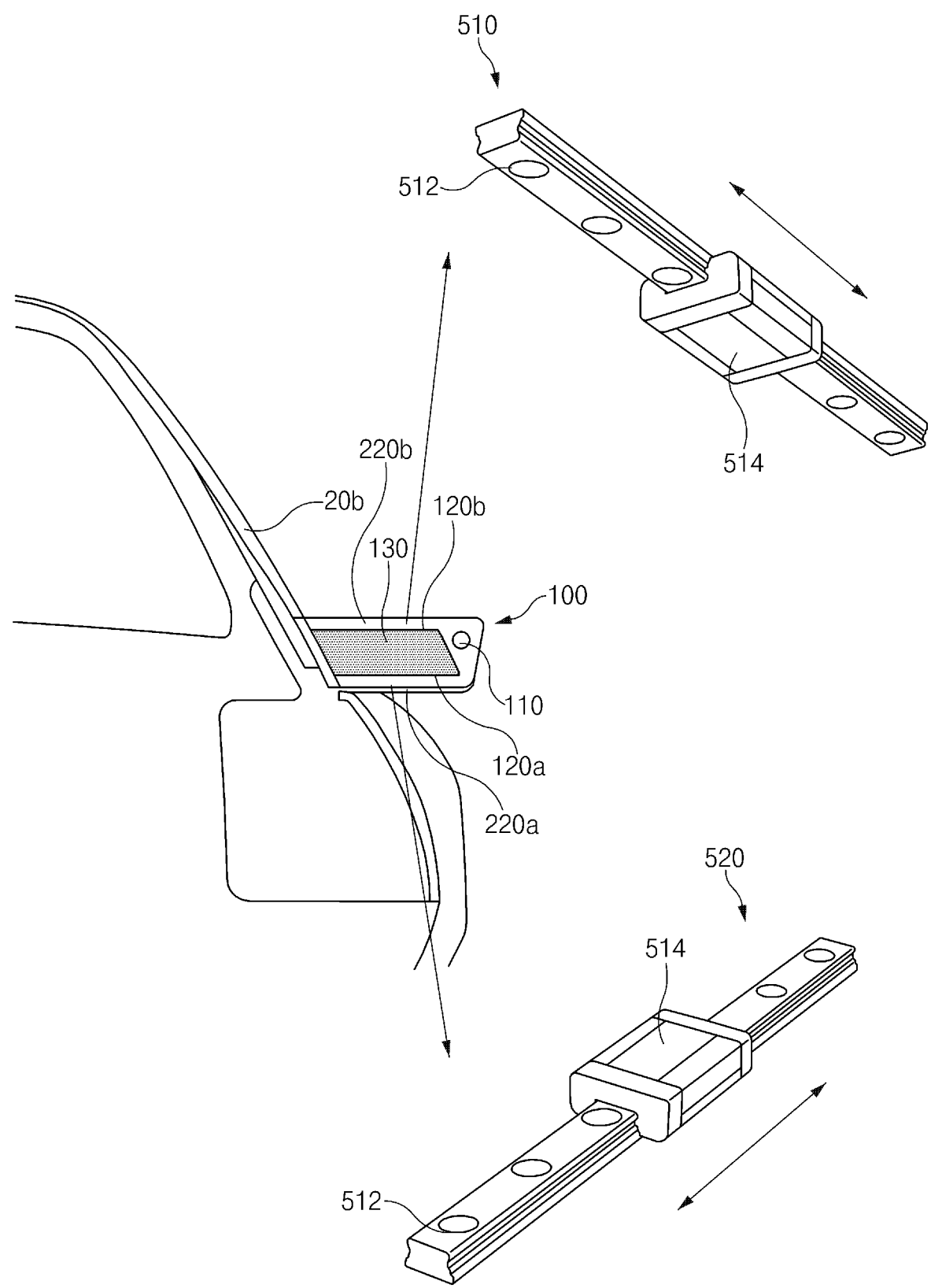
FIG. 5 illustrates a moving unit including a linear motion (LM) guide structure according to various embodiments of the disclosure.

FIG. 5 illustrates a moving unit including a linear motion (LM) guide structure according to various embodiments of the disclosure. FIG. 5 illustrates an example in which the side mirror system 100 for a vehicle includes the lower-end mounting unit 220a and the upper-end mounting unit 220b. However, the same principle may be applied to an example in which the side mirror system 100 for a vehicle includes the lower-end mounting unit 220a or includes the upper-end mounting unit 220b.

Referring to FIG. 5, the moving unit 120 may include an LM guide structure. The moving unit 120 may include a mounting part 512 and a moving part 514. According to an embodiment of the disclosure, the mounting part 512 may be referred to as a "rail", and the moving part 514 may be referred to as a "slider". The moving part 514 may straightly move along the mounting part 512. As illustrated in a reference numeral 510, when the moving unit 120 is positioned at the second location 120b, the electronic side mirror 130 may move to the outside or the inside of the vehicle 1 while being mounted on the bottom surface of the moving part 514. As illustrated in a reference numeral 520, when the moving unit 120 is positioned at the first location 120a, the electronic side mirror 130 may move while being mounted on the top surface of the moving part 514. According to an embodiment of the disclosure, when a specified condition is satisfied, the at least one control circuit 140 may control the moving part 514 to move the moving part 514 along the mounting part 512.

Figure 6:
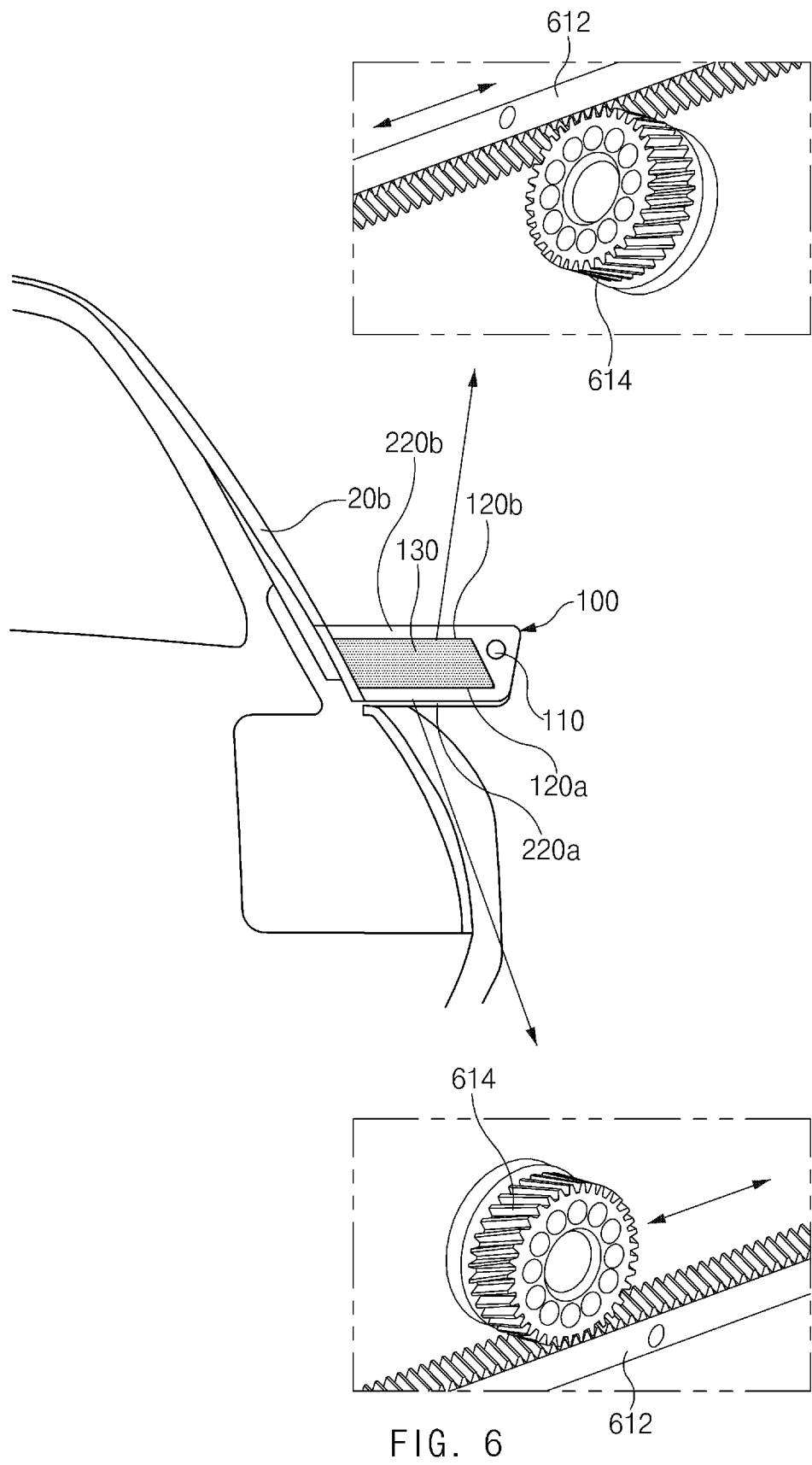
FIG. 6 illustrates a moving unit including a linear gear structure according to various embodiments of the disclosure.

FIG. 6 illustrates a moving unit including a linear gear structure according to various embodiments of the disclosure. FIG. 6 illustrates an example in which the side mirror system 100 for a vehicle includes the lower-end mounting unit 220a and the upper-end mounting unit 220b. However, the same principle may be applied to an example in which the side mirror system 100 for a vehicle includes the lower-end mounting unit 220a or includes the upper-end mounting unit 220b.

Referring to FIG. 6, the moving unit 120 may include a linear gear structure. For example, the linear gear structure may include a rack and pinion structure. The moving unit 120 may include a mounting part 612 and a moving part 614. According to an embodiment of the disclosure, the mounting part 612 may be referred to as a "rack," and the moving part 614 may be referred to as a "pinion." According to an embodiment of the disclosure, the moving part 614 may be embedded in the electronic side mirror 130 or may be mounted outside the electronic side mirror 130. The moving part 614 may straightly move along the mounting part 612. According to an embodiment of the disclosure, when a specified condition is satisfied, the at least one control circuit 140 may control the moving part 614 such that the moving part 614 moves along the mounting part 612.

Figure 7:
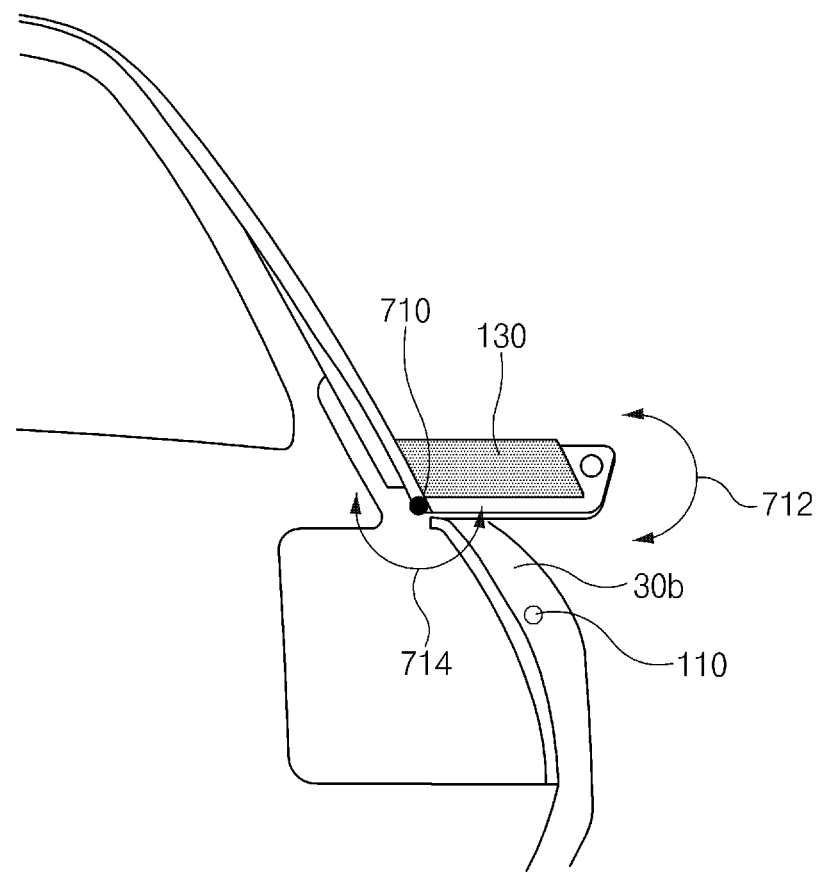
FIG. 7 illustrates a moving unit including a hinge structure according to various embodiments of the disclosure.

FIG. 7 illustrates a moving unit including a hinge structure according to various embodiments of the disclosure. FIG. 7 illustrates an example in which the side mirror system 100 for a vehicle includes the lower-end mounting unit 220a and the upper-end mounting unit 220b. However, the same principle may be applied to an example in which the side mirror system 100 for a vehicle includes the lower-end mounting unit 220a or includes the upper-end mounting unit 220b.

Referring to FIG. 7, the camera module 110 may be mounted in a partial area of the body (e.g., the door 30b) of the vehicle 1. According to an embodiment of the disclosure, the moving unit 120 may include a hinge 710. The hinge 710 may be mounted between the lower-end mounting unit 220a and the A-pillar 20b. The hinge 710 may be folded in a vertical direction 712 or in a horizontal direction 714. When a specified condition is satisfied, the at least one control circuit 140 may fold the hinge 710, and thus may control the electronic side mirror 130 so as to move to the inside of the vehicle 1 together with the lower-end mounting unit 220a.

Figure 8:
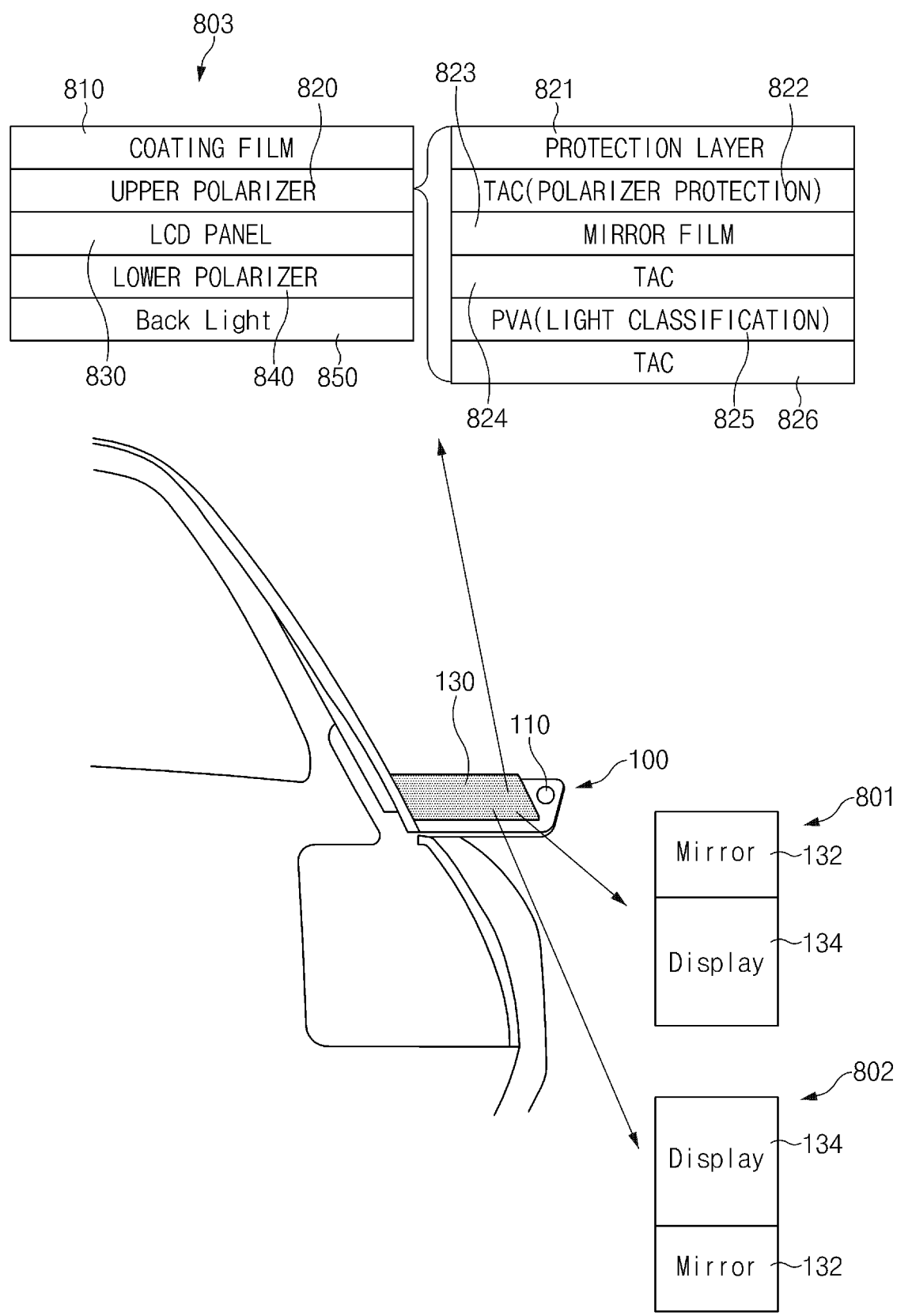
FIG. 8 illustrates a structure of an electronic side mirror according to various embodiments of the disclosure.

FIG. 8 illustrates a structure of an electronic side mirror according to various embodiments of the disclosure.

Referring to FIG. 8, according to an embodiment of the disclosure, as illustrated in a reference numeral 801, the electronic side mirror 130 includes a mirror panel 132 on a front surface and may include a display panel 134 on a rear surface. According to an embodiment of the disclosure, the mirror panel 132 may include a half mirror, which reflects a part of light and through which the remaining parts of light pass. For example, the half mirror may include nickel, aluminum, or titanium on a glass surface, and thus a part of light passes through the half mirror. When the light incident from the outside is reflected by the mirror panel 132, the electronic side mirror 130 may operate in a mirror mode; when the light irradiated from the display panel 134 passes through the mirror panel 132 and then is output, the electronic side mirror 130 may operate in a display mode. According to an embodiment of the disclosure, the display panel 134 may include an LCD, an organic electro luminescence (OEL), or a PDP.

According to an embodiment of the disclosure, as illustrated in a reference numeral 802, the electronic side mirror 130 includes the display panel 134 on a front surface and may include the mirror panel 132 on a rear surface. According to an embodiment of the disclosure, the display panel 134 may include a transparent display. According to an embodiment of the disclosure, the mirror panel 132 may include a mirror film including a reflective medium. When the display panel 134 emits light, the electronic side mirror 130 may operate in the display mode. When the display panel 134 does not emit light, the light incident from the outside passes through the display panel 134 and then is reflected from the mirror panel 132, and thus the electronic side mirror 130 may operate in the mirror mode. According to an embodiment of the disclosure, the display panel 134 may include an OLED.

According to an embodiment of the disclosure, as illustrated in a reference numeral 803, the electronic side mirror 130 may include the display panel 134, and the display panel 134 may include a mirror film 823 performing the function of the mirror panel 132. For example, the display panel 134 may be an LCD. According to an embodiment of the disclosure, the display panel 134 may include a back light 850 for supplying light, an upper polarizer 820 and a lower polarizer 840 that reflect or transmit light, which is supplied from the back light, depending on polarization, and an LCD panel 830 that controls the polarization of light. According to an embodiment of the disclosure, the display panel 134 may further include a coating film 810 for protecting the upper polarizer 820. The upper polarizer 820 may include a protection layer 821, a polyvinyl alcohol (PVA) film 825 for classifying light, and the mirror film 823 for performing the function of an optical mirror and may include tri-acetyl-cellulose (TAC) films 822, 824, and 826 for protecting the PVA film 825 and the mirror film 823.

According to an embodiment of the disclosure, the at least one control circuit 140 may control the electronic side mirror 130 to operate in the mirror mode or in the display mode. For example, the at least one control circuit 140 may control a light emitting device (e.g., the back light 850) included in the display panel 134 so as not to supply light. When the light emitting device of the display panel 134 does not supply light, the light incident from the outside is reflected from the mirror panel 134, and thus the electronic side mirror 130 may operate in the mirror mode. When the light emitting device of the display panel 134 supplies light, the electronic side mirror 130 may operate in the display mode.

Figure 9:
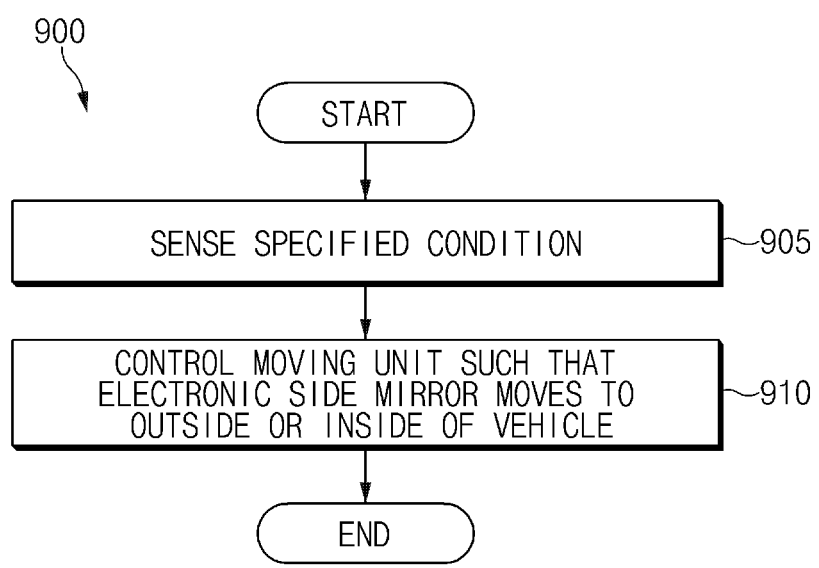
FIG. 9 illustrates an operation flowchart of a side mirror system for a vehicle that controls a moving unit such that an electronic side mirror moves to an inside or outside of a vehicle according to various embodiments of the disclosure.

FIG. 9 illustrates an operation flowchart of a side mirror system for a vehicle that controls a moving unit such that an electronic side mirror moves to an inside or outside of a vehicle according to various embodiments of the disclosure. Operations illustrated in FIG. 9 may be implemented by the side mirror system 100 for a vehicle or the at least one control circuit 140.

Referring to FIG. 9, in operation 905 of a method 900, the at least one control circuit 140 may detect a specified condition. According to an embodiment of the disclosure, in the case where the side mirror system 100 for a vehicle includes the sensor module 150, the specified condition may include whether a value indicating the outside weather state of the vehicle 1 is not less than a specified critical value. For example, the at least one control circuit 140 may determine a value indicating the temperature, humidity, brightness, wind speed, or barometric pressure of the outside of the vehicle 1 through the sensor module 150 and may determine whether the determined value is not less than a specified critical value. When the determined value is not less than the specified critical value, the at least one control circuit 140 may detect that the outside of the vehicle 1 is in bad visibility (e.g., in the case of rain, fog, night, or the like).

According to an embodiment of the disclosure, the specified condition may include whether the display panel 134 operates normally or whether the camera module 110 operates normally. For example, when the display panel 134 does not operate normally, the mode of the at least one control circuit 140 may be changed from the display mode to the mirror mode. When the electronic side mirror 130 is located inside the vehicle 1, the at least one control circuit 140 may control the moving unit 120 such that the electronic side mirror 130 moves to the outside of the vehicle 1.

According to an embodiment of the disclosure, in the case where the side mirror system 100 for a vehicle includes an input device receiving a user input, the specified condition may include a user input to move the electronic side mirror 130. For example, when the at least one control circuit 140 receives a user input to move the electronic side mirror 130 to the inside of the vehicle 1, the at least one control circuit 140 may determine whether the display panel 134 operates normally. When the display panel 134 does not operate normally, the at least one control circuit 140 may control the electronic side mirror 130 so as not to move to the inside of the vehicle 1. For another example, when the at least one control circuit 140 receives a user input to move the electronic side mirror 130 to the outside of the vehicle 1, the at least one control circuit 140 may verify the outside weather state of the vehicle 1. When a value indicating the outside weather state of the vehicle 1 is not less than a critical value, the at least one control circuit 140 may control the electronic side mirror 130 not to move to the outside of the vehicle 1.

In operation 910, the at least one control circuit 140 may control the moving unit 120 such that the electronic side mirror 130 moves to the outside or the inside of the vehicle 1. For example, when the moving unit 120 includes an LM guide structure or a linear gear structure, the at least one control circuit 140 may control the moving unit 120 such that the electronic side mirror 130 moves in a straight direction. For another example, when the moving unit 120 includes a hinge structure, the at least one control circuit 140 may fold the hinge 710 such that the electronic side mirror 130 moves to the inside of the vehicle 1.

According to an embodiment of the disclosure, while the electronic side mirror 130 moves from the outside of the vehicle 1 to the inside of the vehicle 1, the at least one control circuit 140 may control the removing unit 136 to operate.

According to an embodiment of the disclosure, after the electronic side mirror 130 moves to the outside or the inside of the vehicle 1, the at least one control circuit 140 may change the tilt of the electronic side mirror 130.

Figure 10:
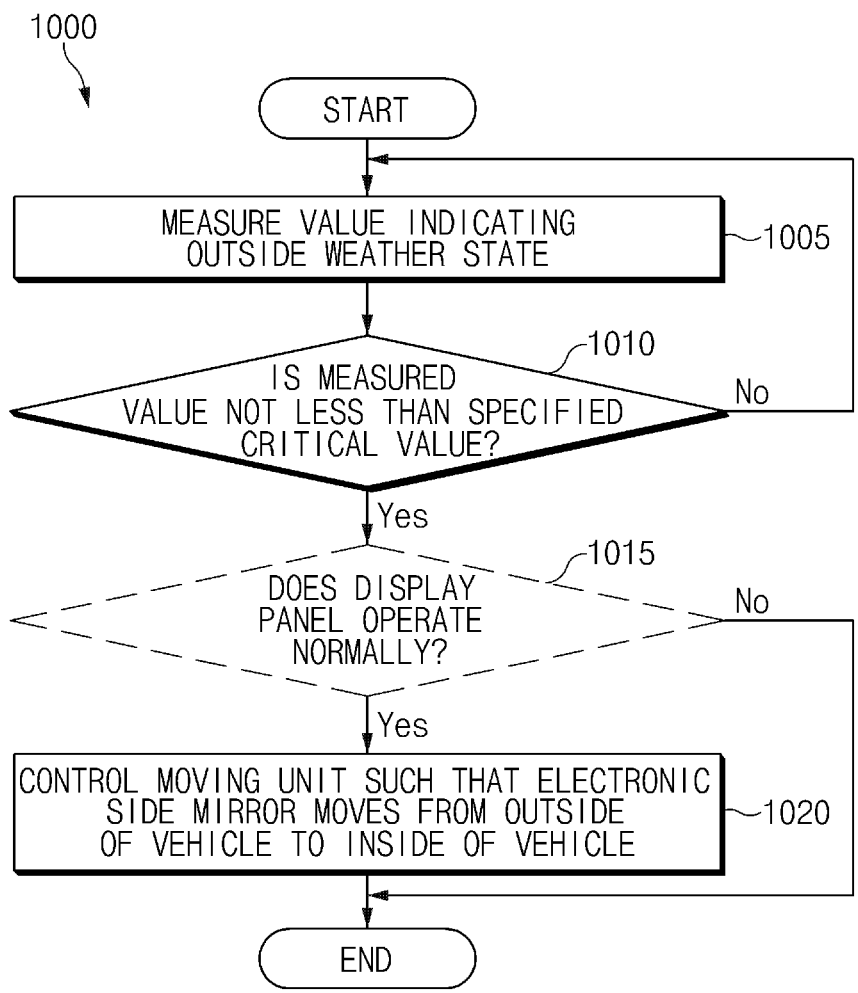
FIG. 10 illustrates an operation flowchart of a side mirror system for a vehicle that controls an electronic side mirror based on an outside weather state of a vehicle according to various embodiments of the disclosure.

FIG. 10 illustrates an operation flowchart of a side mirror system for a vehicle that controls an electronic side mirror based on an outside weather state of a vehicle according to various embodiments of the disclosure.

Referring to FIG. 10, in operation 1005 of a method 1000, the at least one control circuit 140 may specify a value indicating the weather state of the outside of the vehicle 1. For example, the at least one control circuit 140 may measure the temperature, humidity, brightness, wind speed, or barometric pressure of the outside of the vehicle 1.

In operation 1010, the at least one control circuit 140 may determine whether the measured value is not less than a specified critical value. The specified critical value may be a value stored in the side mirror system 100 for a vehicle or a value specified by a user input. When the measured value is less than the critical value, the at least one control circuit 140 may periodically implement operation 1005 to operation 1010. When the measured value is not less than the critical value, the at least one control circuit 140 may implement operation 1020.

In operation 1020, the at least one control circuit 140 may control the moving unit 120 such that the electronic side mirror 130 moves from the outside of the vehicle 1 to the inside of the vehicle 1.

According to an embodiment of the disclosure, before implementing operation 1020, in operation 1015, the at least one control circuit 140 may determine whether the display panel 134 operates normally. When the display panel 134 does not operate normally, the at least one control circuit 140 may terminate an algorithm without moving the electronic side mirror 130 to the inside of the vehicle 1.

Through the above-described method 1000, the side mirror system 100 for a vehicle may provide an environment in which the electronic side mirror 130 is disposed outside the vehicle 1 and a driver verifies the peripheral area of the vehicle 1 even in bad weather.

Figure 11A:
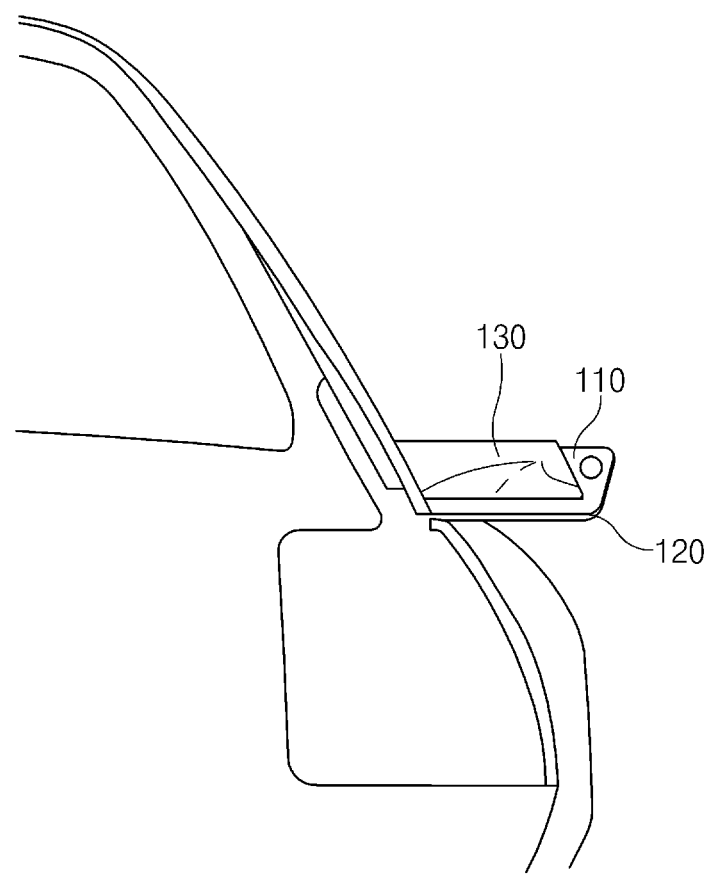
FIG. 11A illustrates a first view of an operation of controlling an electronic side mirror based on an outside weather state of a vehicle according to various embodiments of the disclosure.

FIG. 11A illustrates a first view of an operation of controlling an electronic side mirror based on an outside weather state of a vehicle according to various embodiments of the disclosure.

Referring to FIG. 11A, it is assumed that the electronic side mirror 130 is disposed outside the vehicle 1 and a value indicating an outside weather state is less than a critical value. Referring to FIG. 11A, the camera module 110 may obtain an image associated with the peripheral area of the vehicle 1. The electronic side mirror 130 may output the image obtained by the camera module 110, through the display panel 134. The driver may verify the peripheral area of the vehicle 1 through the electronic side mirror 130 disposed outside the vehicle 1.

Figure 11B:
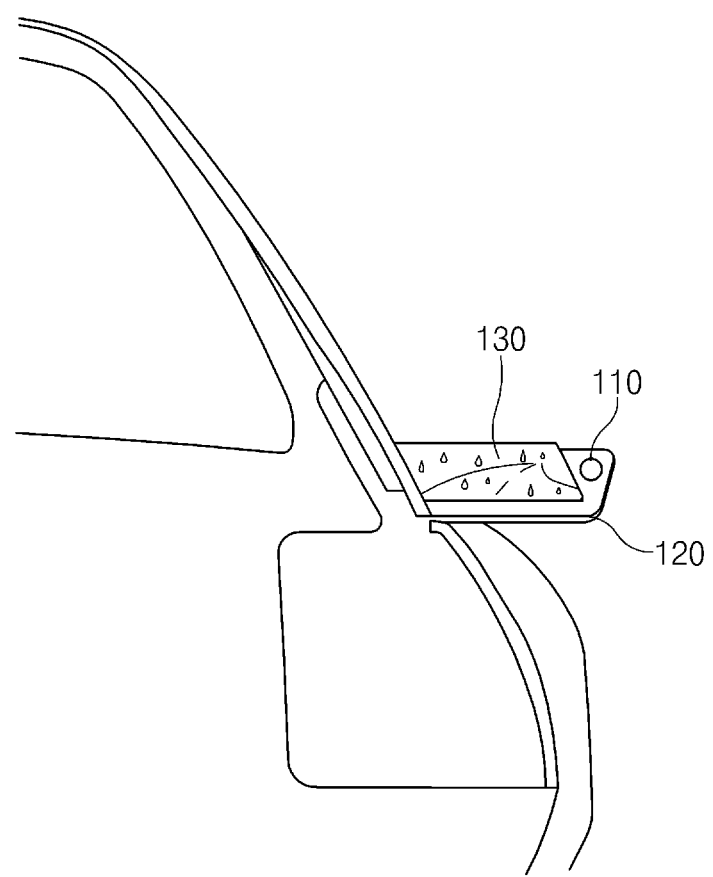
FIG. 11B illustrates a second view of an operation of controlling an electronic side mirror based on an outside weather state of a vehicle according to various embodiments of the disclosure.

FIG. 11B illustrates a second view of an operation of controlling an electronic side mirror based on an outside weather state of a vehicle according to various embodiments of the disclosure.

Referring to FIG. 11B, it is assumed that the electronic side mirror 130 is disposed outside the vehicle 1 and the outside weather state of the vehicle 1 is bad weather. In other words, the at least one control circuit 140 may determine that a value indicating the outside weather state is not less than a critical value. Referring to FIG. 11B, rainwater (or another foreign object) may stick to the front surface of the electronic side mirror 130. It may be inconvenient for a driver to verify the image obtained by the camera module 110.

Figure 11C:
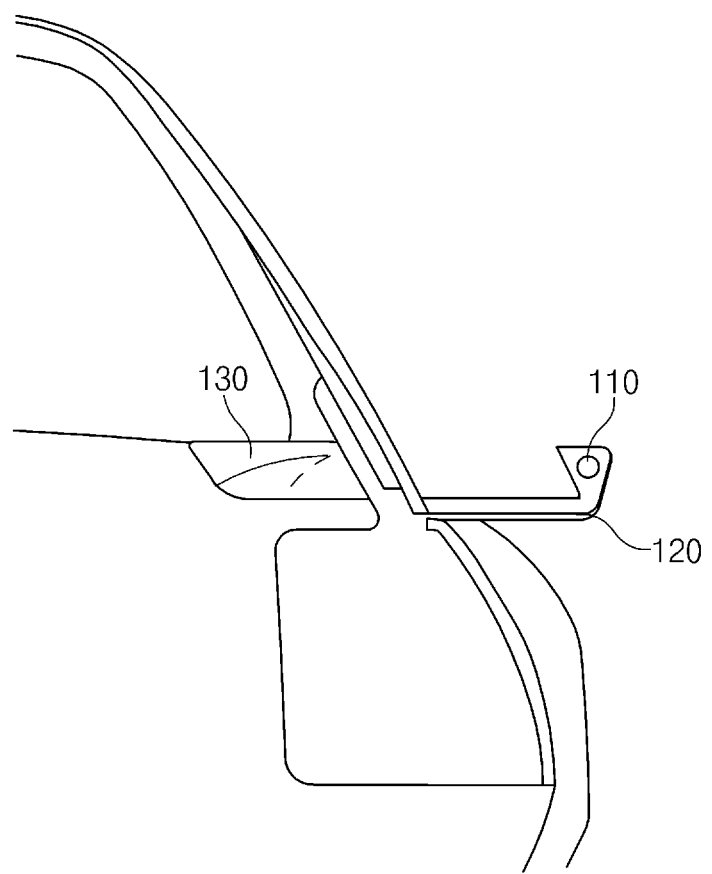
FIG. 11C illustrates a third view of an operation of controlling an electronic side mirror based on an outside weather state of a vehicle according to various embodiments of the disclosure.

FIG. 11C illustrates a third view of an operation of controlling an electronic side mirror based on an outside weather state of a vehicle according to various embodiments of the disclosure.

Referring to FIG. 11C, the at least one control circuit 140 may control the moving unit 120 such that the electronic side mirror 130 moves to the inside of the vehicle 1. When the electronic side mirror 130 moves to the inside of the vehicle 1, a driver may continuously verify the image obtained by the camera module 110.

Figure 12:
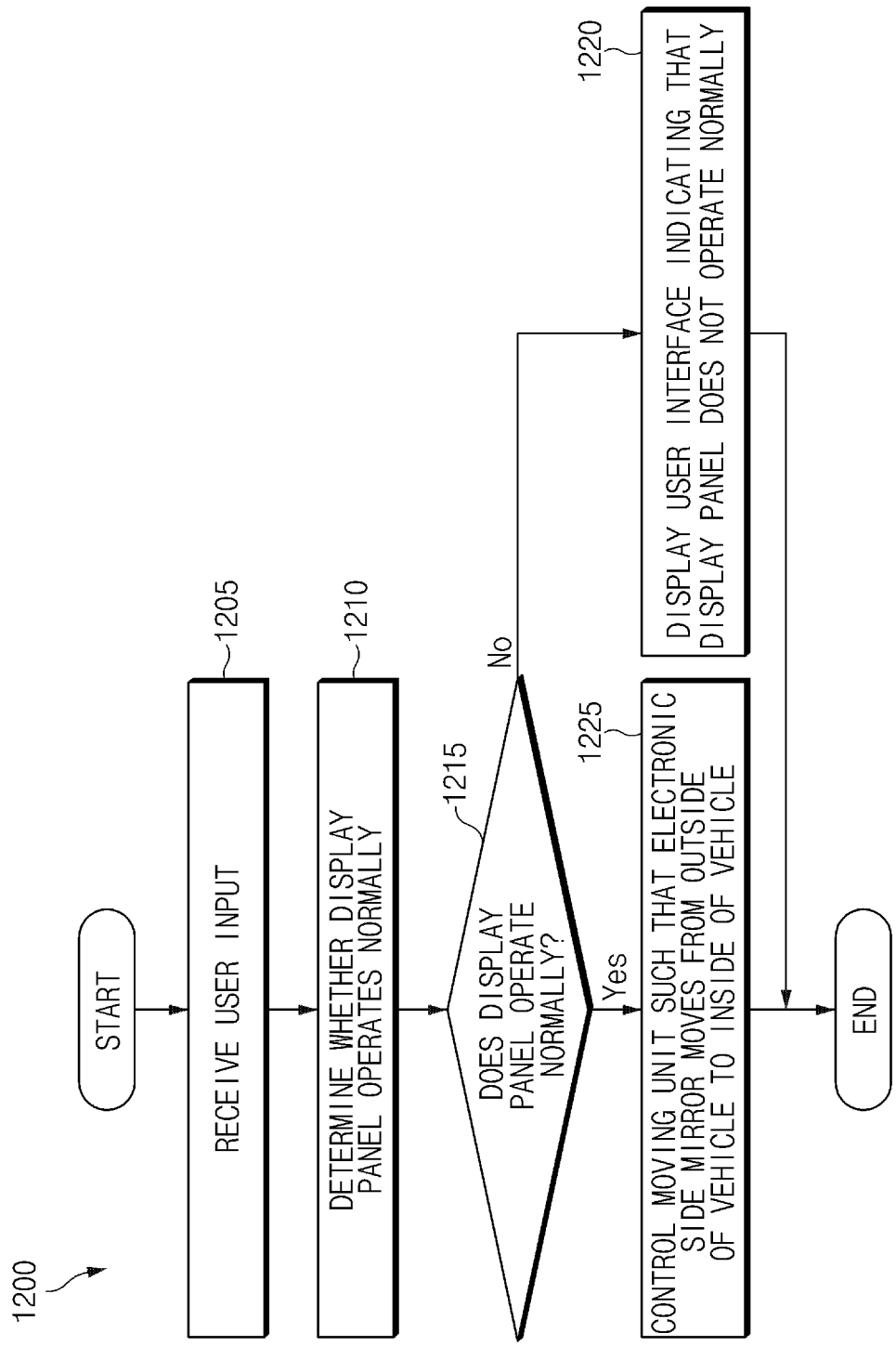
FIG. 12 illustrates an operation flowchart of a side mirror system for a vehicle controlling an electronic side mirror based on a user input according to various embodiments of the disclosure.

FIG. 12 illustrates an operation flowchart of a side mirror system for a vehicle controlling an electronic side mirror based on a user input according to various embodiments of the disclosure. An embodiment is exemplified in FIG. 12 as an example to receive a user input to move the electronic side mirror 130 to the inside of the vehicle 1. However, a similar principle may be applied to the example to receive a user input to move the electronic side mirror 130 to the outside of the vehicle 1.

Referring to FIG. 12, in operation 1205 of a method 1200, the at least one control circuit 140 may receive a user input to move the electronic side mirror 130 to the inside of the vehicle 1.

In operation 1210, the at least one control circuit 140 may determine whether the display panel 134 operates normally. For example, due to the damage to the polarizer or the LCD panel included in the display panel 134, the electronic side mirror 130 may fail to display the image obtained by the camera module 110. According to an embodiment of the disclosure, when a signal periodically received from the electronic side mirror 130 is not received within a specified first critical time, the at least one control circuit 140 may determine that the display panel 134 does not operate normally. According to an embodiment of the disclosure, when the at least one control circuit 140 transmits a signal to the electronic side mirror 130 and does not receive a response signal within a specified second critical time, the at least one control circuit 140 may determine that the display panel 134 does not operate normally. According to an embodiment of the disclosure, the electronic side mirror 130 may transmit, to the at least one control circuit 140, a signal indicating that the display panel 134 does not operate normally.

In operation 1215, the at least one control circuit 140 may determine whether the display panel 134 operates normally. When the display panel 134 does not operate normally, the electronic side mirror 130 may not operate in a display mode, and thus the at least one control circuit 140 may implement operation 1220. When the display panel 134 operates normally, the at least one control circuit 140 may implement operation 1225.

In operation 1220, the at least one control circuit 140 may provide a driver with a user interface (UI) indicating that the display panel 134 does not operate normally. For example, the at least one control circuit 140 may provide a notification that the electronic side mirror 130 does not operate in the display mode, through a speaker embedded in the vehicle 1. For another example, the at least one control circuit 140 may indicate that the electronic side mirror 130 does not operate in the display mode, through another display device (e.g., CID or the display of a navigation device) embedded in the vehicle 1.

In operation 1225, the at least one control circuit 140 may control the moving unit 120 such that the electronic side mirror 130 moves from the outside of the vehicle 1 to the inside of the vehicle 1.

Through the above-described method 1200, the side mirror system 100 for a vehicle may notify a user that the electronic side mirror 130 does not operate normally in an environment where the electronic side mirror 130 is capable of being moved depending on a user input.

Figure 13:
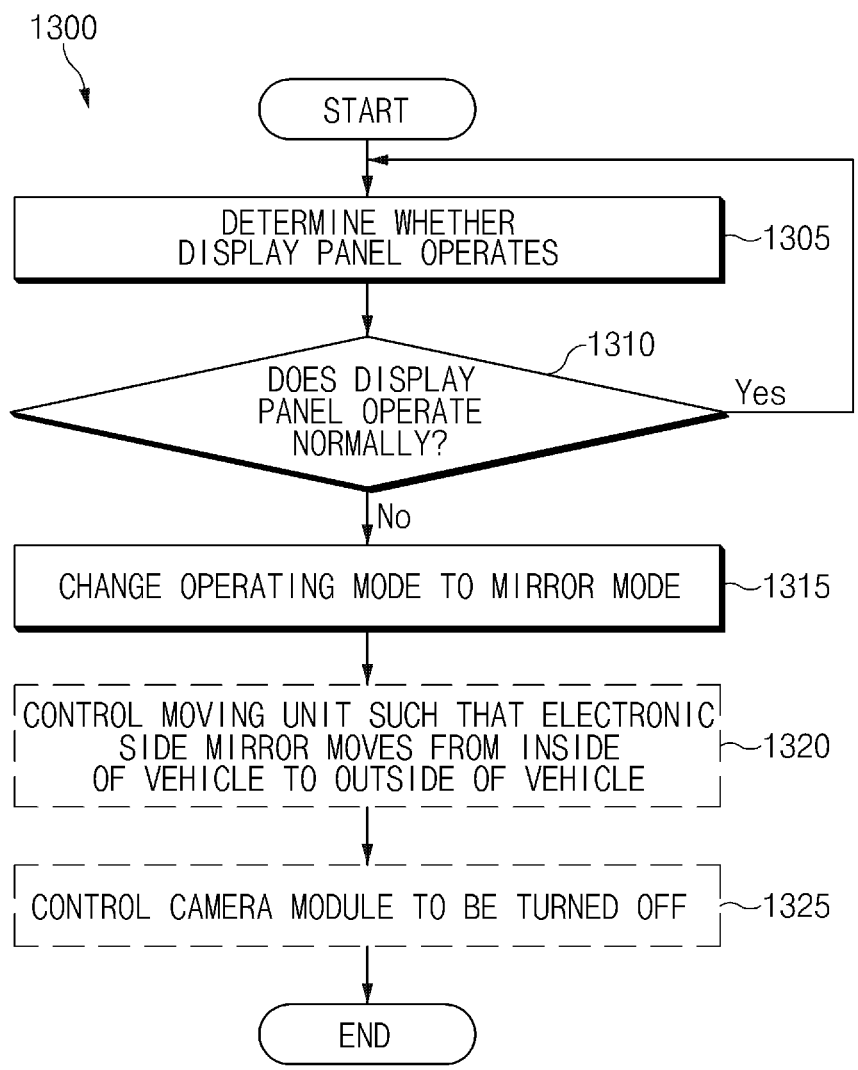
FIG. 13 illustrates an operation flowchart of a side mirror system for a vehicle that controls an electronic side mirror based on whether a display panel operates normally according to various embodiments of the disclosure.

FIG. 13 illustrates an operation flowchart of a side mirror system for a vehicle that controls an electronic side mirror based on whether a display panel operates normally according to various embodiments of the disclosure.

Referring to FIG. 13, in operation 1305 of a method 1300, the at least one control circuit 140 may determine whether the display panel 134 operates. For example, the at least one control circuit 140 may receive a signal indicating that the display panel 134 does not operate normally, from the electronic side mirror 130 or may determine whether the signal is received within a specified critical time (e.g., a first critical time or a second critical time), and thus may determine whether the display panel 134 operates normally.

In operation 1310, the at least one control circuit 140 may determine whether the display panel 134 operates normally; when the display panel 134 operates normally, the at least one control circuit 140 may repeatedly implement operation 1305 and operation 1310. When the display panel 134 does not operate normally, the at least one control circuit 140 may implement operation 1315.

In operation 1315, the at least one control circuit 140 may change the operating mode of the electronic side mirror 130 from a display mode to a mirror mode. For example, the at least one control circuit 140 may allow a light emitting device included in the display panel 134 not to supply light. When the light emitting device does not supply light, the electronic side mirror 130 may operate in the mirror mode through the mirror panel 132.

According to an embodiment of the disclosure, when the electronic side mirror 130 is located inside the vehicle 1, in operation 1320, the at least one control circuit 140 may control the moving unit 120 such that the electronic side mirror 130 moves to the outside of the vehicle 1.

According to an embodiment of the disclosure, in operation 1325, the at least one control circuit 140 may cause the camera module 110 to be turned off for the purpose of reducing the power consumption of the side mirror system 100 for a vehicle.

Figure 14A:
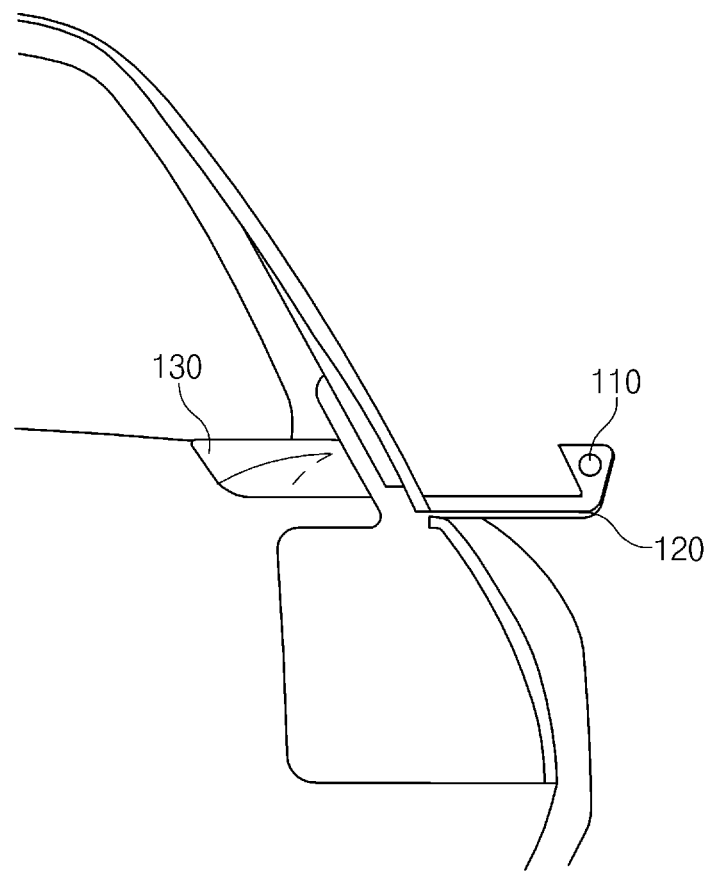
FIG. 14A illustrates a first view of an operation of controlling an electronic side mirror based on whether a display panel operates normally according to various embodiments of the disclosure.

FIG. 14A illustrates a first view of an operation of controlling an electronic side mirror based on whether a display panel operates normally according to various embodiments of the disclosure.

Referring to FIG. 14A, it is assumed that the electronic side mirror 130 is disposed inside the vehicle 1 and operates in a display mode. Referring to FIG. 14A, the camera module 110 may obtain an image associated with the peripheral area of the vehicle 1. The electronic side mirror 130 may output the image obtained by the camera module 110, through the display panel 134. A driver may verify the peripheral area of the vehicle 1 through the electronic side mirror 130 disposed inside the vehicle 1.

Figure 14B:
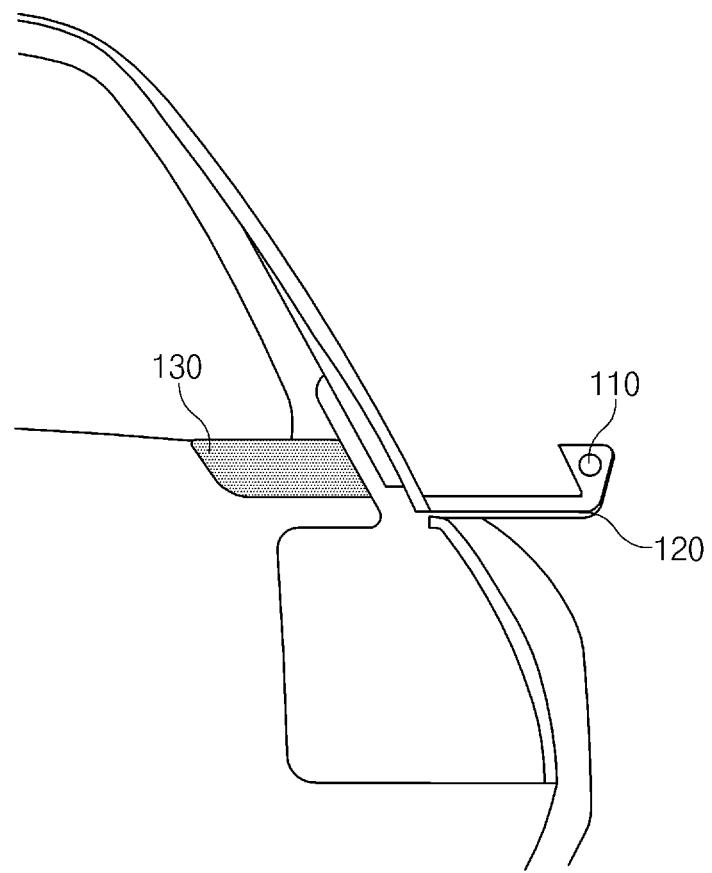
FIG. 14B illustrates a second view of an operation of controlling an electronic side mirror based on whether a display panel operates normally according to various embodiments of the disclosure.

FIG. 14B illustrates a second view of an operation of controlling an electronic side mirror based on whether a display panel operates normally according to various embodiments of the disclosure.

Referring to FIG. 14B, it is assumed that the display panel 134 of the electronic side mirror 130 does not operate normally. Referring to FIG. 14B, the electronic side mirror 130 may not output the image obtained by the camera module 110, through the display panel 134.

Figure 14C:
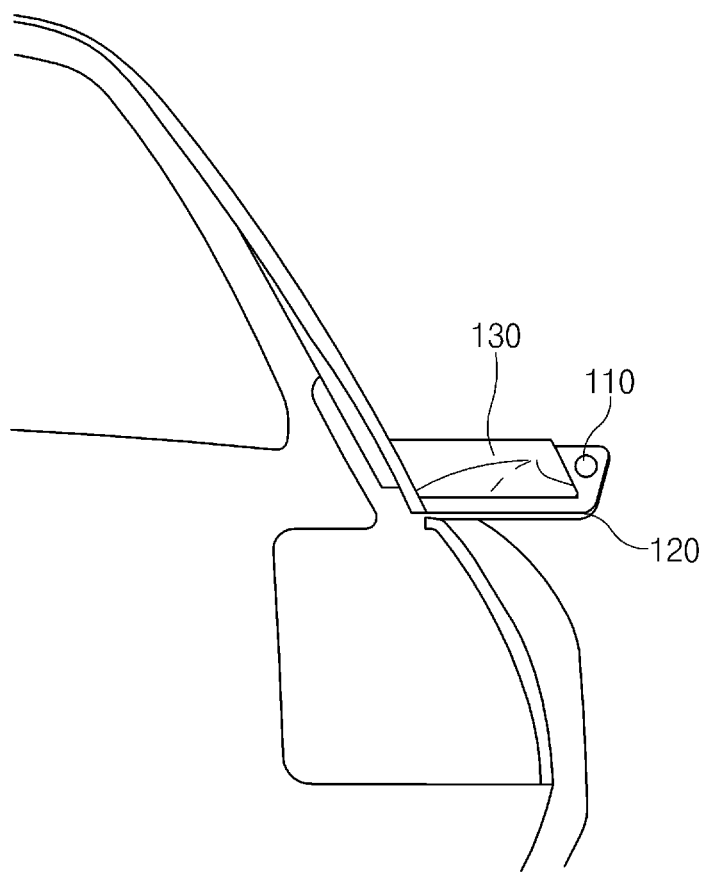
FIG. 14C illustrates a third view of an operation of controlling an electronic side mirror based on whether a display panel operates normally according to various embodiments of the disclosure.

FIG. 14C illustrates a third view of an operation of controlling an electronic side mirror based on whether a display panel operates normally according to various embodiments of the disclosure.

Referring to FIG. 14C, the at least one control circuit 140 may change the operating mode of the electronic side mirror 130 to a mirror mode and may control the moving unit 120 such that the electronic side mirror 130 moves to the outside of the vehicle 1. A driver may verify the peripheral area of the vehicle 1 through the electronic side mirror 130 operating in the mirror mode.

Figure 15A:
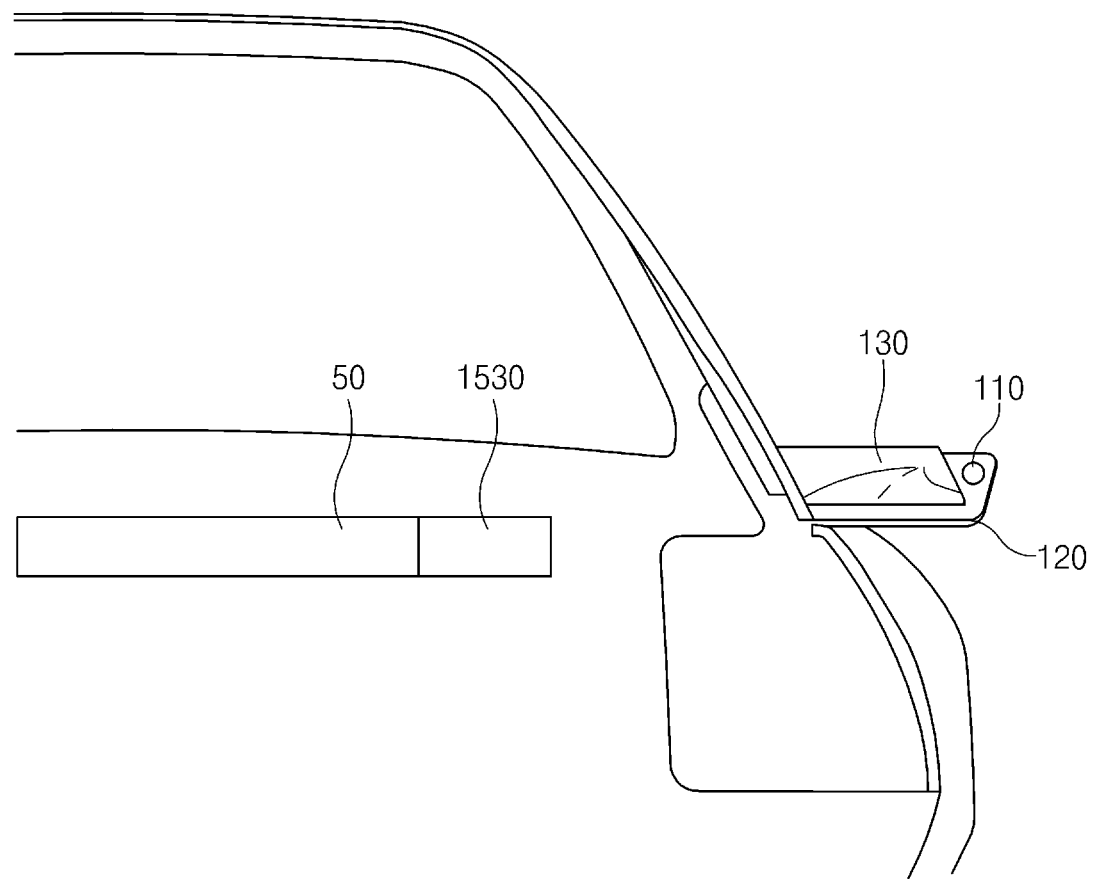
FIG. 15A illustrates a first view of an operation of controlling a side mirror system for a vehicle including an additional display device according to various embodiments of the disclosure.

FIG. 15A illustrates a first view of an operation of controlling a side mirror system for a vehicle including an additional display device according to various embodiments of the disclosure.

Referring to FIG. 15A, the side mirror system 100 for a vehicle may include an additional display device 1530 inside the vehicle 1. For example, the display device 1530 may be disposed in a dashboard 50 (or a part of a trim).

According to an embodiment of the disclosure, the display device 1530 may include a display panel (e.g., the display panel 134). For example, the display panel may include one of an LCD, a TFT LCD, an OLED, or a PDP.

According to an embodiment of the disclosure, while the electronic side mirror 130 outputs the image obtained by the camera module 110, the display device 1530 may output an image indicating a color of the dashboard 50. For example, the color of the dashboard 50 may include a wood grain or a metal grain.

According to an embodiment of the disclosure, the tilt of the display device 1530 may be changed. For example, the at least one control circuit 140 may change the tilt of the display device 1530 based on the specified value or may change the tilt of the display device 1530 in response to a user input.

Figure 15B:
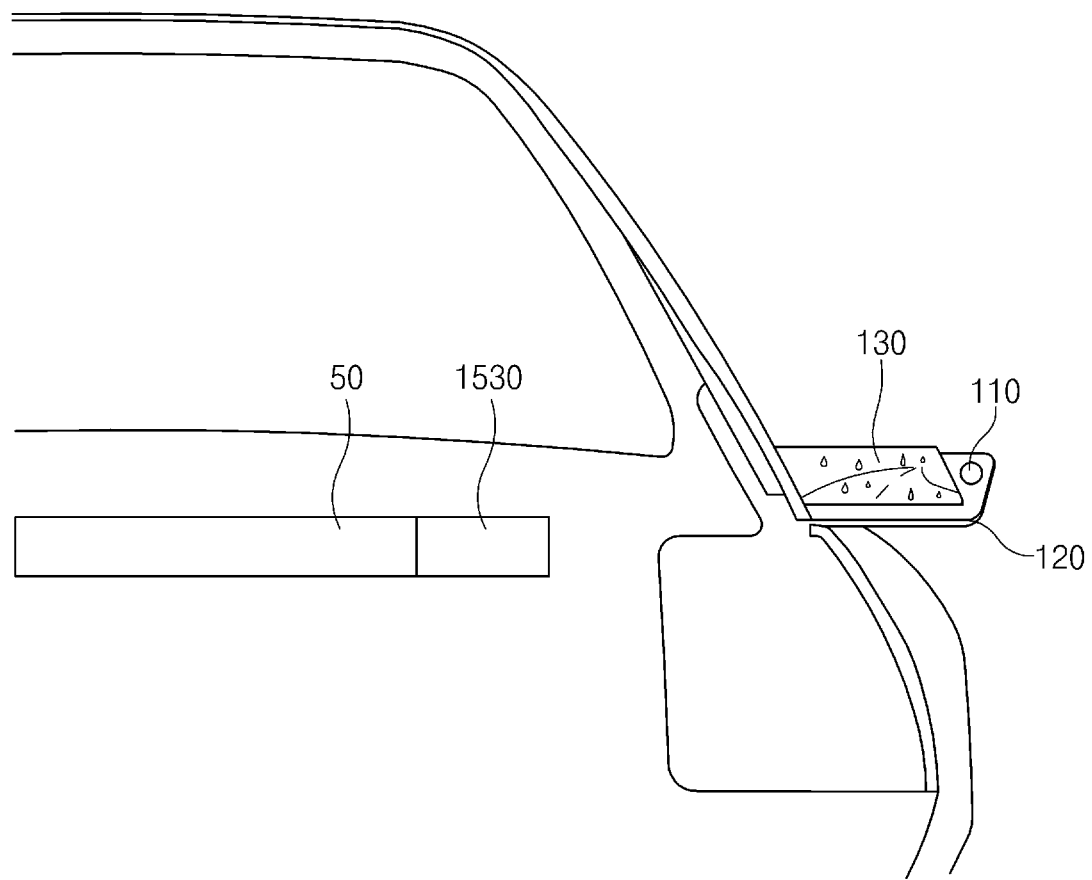
FIG. 15B illustrates a second view of an operation of controlling a side mirror system for a vehicle including an additional display device according to various embodiments of the disclosure.

FIG. 15B illustrates a second view of an operation of controlling a side mirror system for a vehicle including an additional display device according to various embodiments of the disclosure.

Referring to FIG. 15B, it is assumed that the outside weather state of the vehicle 1 is bad weather. In other words, the at least one control circuit 140 may determine that a value indicating the outside weather state is not less than a critical value. Referring to FIG. 15B, rainwater (or another foreign object) may stick to the front surface of the electronic side mirror 130. It may be inconvenient for a driver to verify the image obtained by the camera module 110.

An embodiment is exemplified in FIG. 15B as the outside weather state of the vehicle 1 is bad weather. However, the same principle may be applied to an example in which the electronic side mirror 130 is disposed outside the vehicle 1 and the display panel 134 does not operate normally.

Figure 15C:
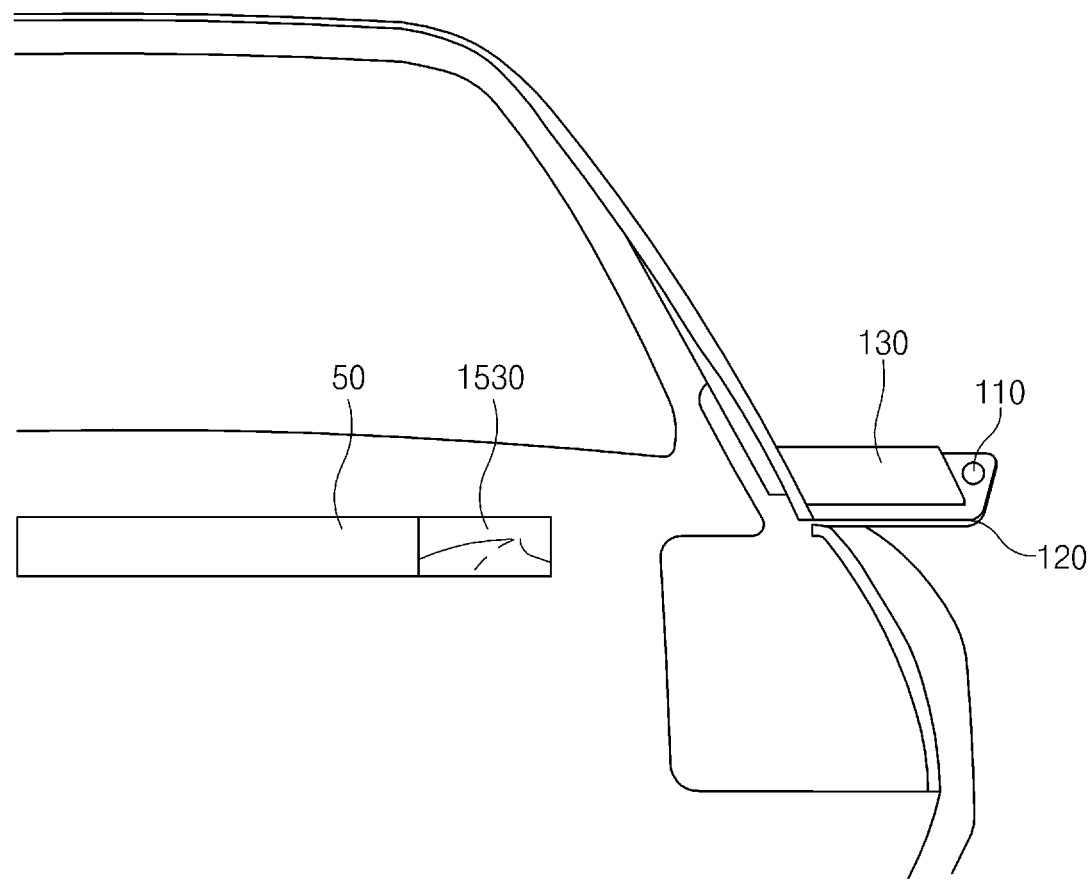
FIG. 15C illustrates a third view of an operation of controlling a side mirror system for a vehicle including an additional display device according to various embodiments of the disclosure.

FIG. 15C illustrates a third view of an operation of controlling a side mirror system for a vehicle including an additional display device according to various embodiments of the disclosure.

Referring to FIG. 15C, the at least one control circuit 140 may control the display device 1530 so as to output the image obtained by the camera module 110, in response to the fact that the value indicating the weather state of the outside of the vehicle 1 is not less than a critical value or in response to detecting that the display panel 134 does not operate normally.

Through the above-described method, when a specified condition is satisfied, the side mirror system 100 for a vehicle may output the image obtained by the camera module 110, through the additional display device 1530, and thus may provide a backup environment when the electronic side mirror 130 does not operate normally.

Figure 16:
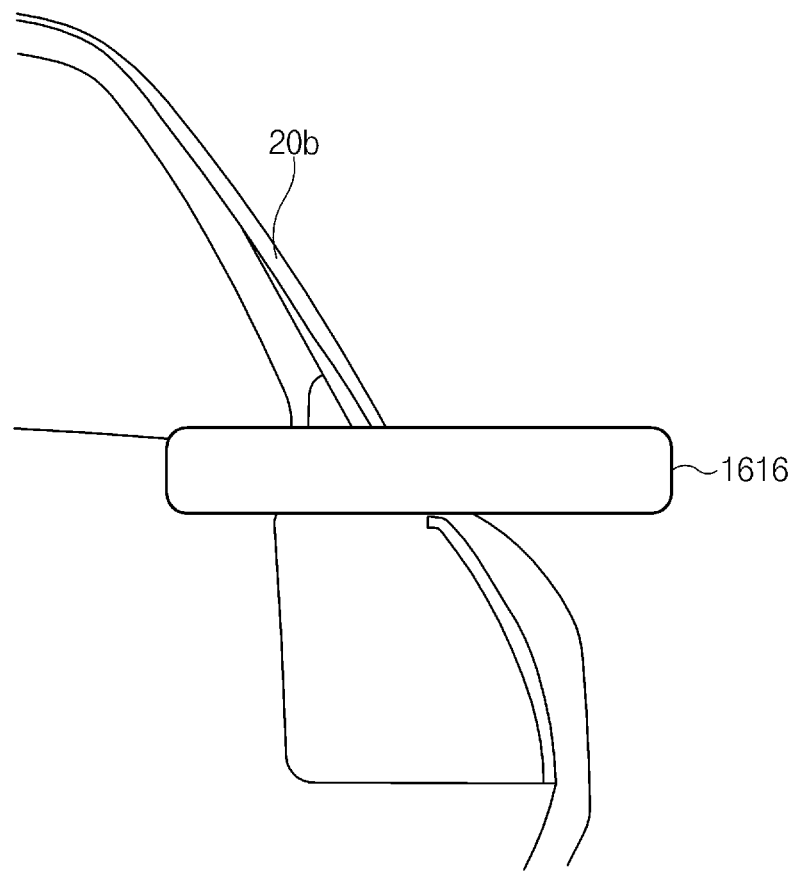
FIG. 16 illustrates a side mirror system for a vehicle in which a plurality of electronic side mirrors are integrally formed according to various embodiments of the disclosure.

FIG. 16 illustrates a side mirror system for a vehicle in which a plurality of electronic side mirrors are integrally formed according to various embodiments of the disclosure.

Referring to FIG. 16, the side mirror system 100 for a vehicle may include an integrated electronic side mirror 1616 in which a plurality of electronic side mirrors are integrally formed. For example, the integrated electronic side mirror 1616 may include the electronic side mirror 130 and the display device 1530. According to an embodiment of the disclosure, a part of the integrated electronic side mirror 1616 may be disposed outside the vehicle 1 (e.g., the right side of the A-pillar 20b), and the remaining parts of the integrated electronic side mirror 1616 may be disposed inside the vehicle 1 (e.g., the front surface of the air conditioner of a passenger's seat).

According to an embodiment of the disclosure, the integrated electronic side mirror 1616 may output the image obtained by the camera module 110. According to an embodiment of the disclosure, a part of the integrated electronic side mirror 1616 may output the image obtained by the camera module 110, and the remaining part may fail to output the image. According to an embodiment of the disclosure, a part of the integrated electronic side mirror 1616 may output the image obtained by the camera module 110, and the remaining part may output an image associated with the front blind spot generated by the A-pillar 20b.

As described above, a side mirror system for a vehicle (e.g., the side mirror system 100 for a vehicle of FIG. 1) may include a camera module (e.g., the camera module 110 of FIG. 1) disposed outside the vehicle (e.g., the vehicle 1 of FIG. 1) and capturing a peripheral area of the vehicle, an electronic side mirror (e.g., the electronic side mirror 130 of FIG. 1) including a mirror panel (e.g., the mirror panel 132 of FIG. 8) and a display panel (e.g., the display panel 134 of FIG. 8), a moving unit (e.g., the moving unit 120 of FIG. 1) moving the electronic side mirror to an inside or an outside of the vehicle, and at least one control circuit (e.g., the at least one control circuit 140 of FIG. 1) electrically connected to the camera module, the electronic side mirror, and the moving unit. The at least one control circuit may be configured to control the electronic side mirror such that the electronic side mirror outputs an image obtained by the camera module through the display panel or the peripheral area of the vehicle is reflected by the mirror panel and to control the moving unit such that the electronic side mirror moves from the outside of the vehicle to the inside of the vehicle, when a specified condition is satisfied.

According to an embodiment of the disclosure, the side mirror system for the vehicle may further include a removing unit (e.g., the removing unit 136 of FIG. 2A). The at least one control circuit may be configured to control the removing unit to remove rainwater or a foreign object from the electronic side mirror, while the electronic side mirror moves from the outside of the vehicle to the inside of the vehicle.

According to an embodiment of the disclosure, the moving unit may include one of a LM guide structure or a linear gear structure, and the at least one control circuit may be configured to control the moving unit such that the electronic side mirror moves left or right. According to an embodiment of the disclosure, the moving unit may include a hinge. The at least one control circuit may be configured to control the moving unit such that the hinge is folded.

According to an embodiment of the disclosure, the side mirror system for the vehicle may further include a sensor module (e.g., the sensor module 150 of FIG. 1) measuring an outside weather state of the vehicle. The at least one control circuit may be configured to determine a value indicating the outside weather state of the vehicle through the sensor module and to control the moving unit such that the electronic side mirror moves from the outside of the vehicle to the inside of the vehicle, when the determined value is not less than a specified critical value.

According to an embodiment of the disclosure, the at least one control circuit may be configured to detect whether the display panel operates normally and to control the electronic side mirror such that the peripheral area of the vehicle is reflected by the mirror panel, when the display panel does not operate normally.

According to an embodiment of the disclosure, the at least one control circuit may be configured to receive a user input to move the electronic side mirror from the outside of the vehicle to the inside of the vehicle, to detect whether the display panel operates normally, and to control the moving unit such that the electronic side mirror moves from the outside of the vehicle to the inside of the vehicle, when the display panel operates normally.

According to an embodiment of the disclosure, the side mirror system for the vehicle may further include a display device (e.g., the display device 1530 of FIG. 15A) inside the vehicle. The at least one control circuit may be configured to control the display device so as to output the image obtained by the camera module regardless of the specified condition.

As described above, a side mirror system for a vehicle (e.g., the side mirror system 100 for a vehicle of FIG. 1) may include a sensor module (e.g., the sensor module 150 of FIG. 1), a camera module (e.g., the camera module 110 of FIG. 1) disposed outside the vehicle (e.g., the vehicle 1 of FIG. 1) and capturing a peripheral area of the vehicle, an electronic side mirror (e.g., the electronic side mirror 130 of FIG. 1) including a mirror panel (e.g., the mirror panel 132 of FIG. 8) and a display panel, a moving unit (e.g., the moving unit 120 of FIG. 1) moving the electronic side mirror to an inside or an outside of the vehicle, and at least one control circuit (e.g., the at least one control circuit 140 of FIG. 1) electrically connected to the camera module, the electronic side mirror, and the moving unit. The at least one control circuit may be configured to control the electronic side mirror such that the electronic side mirror outputs an image obtained by the camera module through the display panel or the peripheral area of the vehicle is reflected by the mirror panel, to detect an outside weather state of the vehicle through the sensor module, and to control the moving unit such that the electronic side mirror moves from the outside of the vehicle to the inside of the vehicle.

According to an embodiment of the disclosure, the side mirror system for the vehicle may further include a removing unit (e.g., the removing unit 136 of FIG. 2A). The at least one control circuit may be configured to control the removing unit to remove rainwater or a foreign object from the electronic side mirror, while the electronic side mirror moves from the outside of the vehicle to the inside of the vehicle.

According to an embodiment of the disclosure, the moving unit may include one of a LM guide structure or a linear gear structure, and the at least one control circuit may be configured to control the moving unit such that the electronic side mirror moves left or right. According to an embodiment of the disclosure, the moving unit may include a hinge. The at least one control circuit may be configured to control the moving unit such that the hinge is folded.

According to an embodiment of the disclosure, the at least one control circuit may be configured to detect whether the display panel operates normally and to control the electronic side mirror such that the peripheral area of the vehicle is reflected by the mirror panel, when the display panel does not operate normally.

According to an embodiment of the disclosure, the at least one control circuit may be configured to control the electronic side mirror such that a tilt of the electronic side mirror is changed, when the electronic side mirror moves to the inside of the vehicle.

According to an embodiment of the disclosure, the side mirror system for the vehicle may further include a display device (e.g., the display device 1530 of FIG. 15A) inside the vehicle. The at least one control circuit may be configured to control the display device so as to output the image obtained by the camera module regardless of the specified condition.

As described above, a method of a side mirror system for a vehicle (e.g., the side mirror system 100 for a vehicle of FIG. 1) may include detecting a specified condition and controlling a moving unit such that an electronic side mirror including a mirror panel and a display panel moves from an outside of the vehicle to an inside of the vehicle. The electronic side mirror may be configured to output an image obtained by a camera module through the display panel or is configured such that a peripheral area of the vehicle is reflected by the mirror panel.

According to an embodiment of the disclosure, the detecting of the specified condition may include detecting an outside weather state of the vehicle and determining whether a value indicating the outside weather state of the vehicle is not less than a specified critical value.

According to an embodiment of the disclosure, the method may further include detecting whether the display panel operates normally, when the value indicating the outside weather state of the vehicle is not less than the specified critical value and controlling the moving unit such that the electronic side mirror moves from the outside of the vehicle to the inside of the vehicle, when the display panel operates normally.

According to an embodiment of the disclosure, the method may further include controlling the electronic side mirror such that the peripheral area of the vehicle is reflected by the mirror panel, when the display panel does not operate normally.

According to an embodiment of the disclosure, the method may further include controlling the camera module so as to be turned off.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor (e.g., the control circuit 140), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment of the disclosure, the method according to various embodiments disclosed in the disclosure may be provided as a part of a computer program product. The computer program product may be traded between a seller and a buyer as a product. The computer program product may be distributed in the form of machine-readable storage medium (e.g., a compact disc-read only memory (CD-ROM)) or may be distributed only through an application store (e.g., a Play Store™). In the case of online distribution, at least a portion of the computer program product may be temporarily stored or generated in a storage medium, such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each of the corresponding components prior to the integration. Operations performed by a module, a programming, or other components according to various embodiments of the disclosure may be executed sequentially, in parallel, repeatedly, or in a heuristic method. In addition, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A side mirror system for a vehicle comprising:
a camera disposed outside the vehicle and configured to capture a peripheral area of the vehicle;
an electronic side mirror including:
a display panel including a back light, a lower polarizer on the back light, LCD (liquid crystal display) panel on the lower polarizer, a upper polarizer on the LCD panel and a protective layer arranged above the upper polarizer, the upper polarizer including a mirror film and the mirror film being viewable while the display panel is not emitting lights using the back light;
a moving device configured to move the electronic side mirror to an inside or an outside of the vehicle, the moving device coupled to a rear surface of the electronic side mirror; and
at least one control circuit electrically connected to the camera, the electronic side mirror, and the moving device, wherein the at least one control circuit is configured to:
determine a position of the electronic side mirror based on a specified condition,
control the moving device to position the electronic side mirror to the outside of the vehicle or to the inside of the vehicle, when the determined position is different from a current position of the electronic side mirror,
when the electronic side mirror is inside the vehicle, control the display panel to display at least one image of the peripheral area captured by the camera by emitting lights using the back light, and
when the electronic side mirror is outside the vehicle, control the display panel to be turned-off to allow the mirror film to reflect at least one image of the peripheral area,
wherein the mirror film and the LCD panel overlap each other regardless of whether the electronic side mirror is inside the vehicle or outside the vehicle.

2. The side mirror system of claim 1, further comprising:
a removing device,
wherein the at least one control circuit is further configured to:
control the removing device to remove rainwater or a foreign object from the electronic side mirror, while the electronic side mirror moves from the outside of the vehicle to the inside of the vehicle.

3. The side mirror system of claim 1,
wherein the moving device includes one of a linear motion (LM) guide structure or a linear gear structure, and
wherein the at least one control circuit is further configured to:
control the moving device such that the electronic side mirror moves left or right.

4. The side mirror system of claim 1, further comprising:
a sensor configured to measure an outside weather state of the vehicle,
wherein the at least one control circuit is further configured to:
determine a value indicating the outside weather state of the vehicle through the sensor, and
control the moving device such that the electronic side mirror moves from the outside of the vehicle to the inside of the vehicle, when the determined value is not less than a specified critical value.

5. The side mirror system of claim 1,
wherein the moving device includes a hinge, and
wherein the at least one control circuit is further configured to:
control the moving device such that the hinge is folded.

6. The side mirror system of claim 1, wherein the at least one control circuit is further configured to:
detect whether the display panel operates normally, and
control the moving device to position the electronic side mirror outside of the vehicle, when the display panel does not operate normally.

7. The side mirror system of claim 1, wherein the at least one control circuit is further configured to:
receive a user input to move the electronic side mirror from the outside of the vehicle to the inside of the vehicle,
detect whether the display panel operates normally, and
control the moving device such that the electronic side mirror moves from the outside of the vehicle to the inside of the vehicle, when the display panel operates normally.

8. The side mirror system of claim 1, further comprising:
a display device disposed inside the vehicle,
wherein the at least one control circuit is further configured to:
control the display device so as to output the image obtained by the camera regardless of the specified condition.

9. A side mirror system for a vehicle comprising:
a sensor;
a camera disposed outside the vehicle and configured to capture a peripheral area of the vehicle;
an electronic side mirror including:
a display panel including a back light, a lower polarizer on the back light, LCD (liquid crystal display) panel on the lower polarizer, a upper polarizer on the LCD panel and a protective layer arranged above the upper polarizer, the upper polarizer including a mirror film and the mirror film being viewable while the display panel is not emitting lights using the back light;
a moving device configured to move the electronic side mirror to an inside or an outside of the vehicle, the moving device coupled to a rear surface of the electronic side mirror; and
at least one control circuit electrically connected to the camera, the electronic side mirror, and the moving device, wherein the at least one control circuit is configured to:
detect an outside weather state of the vehicle through the sensor,
determine a position of the electronic side mirror based on the detected weather state,
control the moving device to position the electronic side mirror to the outside of the vehicle or to the inside of the vehicle, when the determined position is different from a current position of the electronic side mirror,
when the electronic side mirror is inside the vehicle, control the display panel to display at least one image of the peripheral area captured by the camera by emitting lights using the back light, and
when the electronic side mirror is outside the vehicle, control the display panel to be turned-off to allow the mirror film to reflect at least one image of the peripheral area, wherein the mirror film and the LCD panel overlap each other regardless of whether the electronic side mirror is inside the vehicle or outside the vehicle.

10. The side mirror system of claim 9, further comprising:
a removing device,
wherein the at least one control circuit is further configured to:
   control the removing device to remove rainwater or a foreign object from the electronic side mirror, while the electronic side mirror moves from the outside of the vehicle to the inside of the vehicle.

11. The side mirror system of claim 9,
wherein the moving device includes one of a linear motion (LM) guide structure or a linear gear structure, and
wherein the at least one control circuit is further configured to:
   control the moving device such that the electronic side mirror moves left or right.

12. The side mirror system of claim 9,
wherein the moving device includes a hinge, and
wherein the at least one control circuit is further configured to:
   control the moving device such that the hinge is folded.

13. The side mirror system of claim 9, wherein the at least one control circuit is further configured to:
   detect whether the display panel operates normally, and
   control the moving device to position the electronic side mirror outside of the vehicle, when the display panel does not operate normally.

14. The side mirror system of claim 9, wherein the at least one control circuit is further configured to:
   control the electronic side mirror such that a tilt of the electronic side mirror is changed, when the electronic side mirror moves to the inside of the vehicle.

15. The side mirror system of claim 9, further comprising:
a display device disposed inside the vehicle,
wherein the at least one control circuit is further configured to:
   control the display device so as to output the image obtained by the camera regardless of a specified condition.

* * * * *